United States Patent
Higginson et al.

(10) Patent No.: US 12,423,155 B2
(45) Date of Patent: Sep. 23, 2025

(54) MULTI-LAYER FORECASTING OF COMPUTATIONAL WORKLOADS

(71) Applicant: Oracle International Corporation, Redwood Shores, CA (US)

(72) Inventors: Antony Stephen Higginson, Cheshire (GB); Octavian Arsene, Bucharest (RO); Mihaela Dediu, Manchester (GB); Thomas Elders, Dublin (IE)

(73) Assignee: Oracle International Corporation, Redwood Shores, CA (US)

(*) Notice: Subject to any disclaimer, the term of this patent is extended or adjusted under 35 U.S.C. 154(b) by 303 days.

(21) Appl. No.: 18/152,481

(22) Filed: Jan. 10, 2023

(65) Prior Publication Data

US 2023/0153165 A1    May 18, 2023

Related U.S. Application Data

(63) Continuation-in-part of application No. 16/917,821, filed on Jun. 30, 2020, now Pat. No. 11,586,706.

(60) Provisional application No. 62/939,603, filed on Nov. 23, 2019, provisional application No. 62/901,088, filed on Sep. 16, 2019.

(51) Int. Cl.
     *G06F 9/50*      (2006.01)
     *G06F 11/34*      (2006.01)
     *G06N 20/20*      (2019.01)

(52) U.S. Cl.
CPC .............. *G06F 9/505* (2013.01); *G06F 9/50* (2013.01); *G06F 11/3409* (2013.01); *G06F 11/3442* (2013.01); *G06F 11/3447* (2013.01); *G06F 2209/5019* (2013.01); *G06F 2209/5022* (2013.01); *G06N 20/20* (2019.01)

(58) Field of Classification Search
None
See application file for complete search history.

(56) References Cited

U.S. PATENT DOCUMENTS

| | | |
|---|---|---|
| 7,716,022 B1 | 5/2010 | Park et al. |
| 10,372,572 B1 | 8/2019 | Kesarwani et al. |
| 2010/0027432 A1 | 2/2010 | Gopalan et al. |
| 2011/0302112 A1 | 12/2011 | Shan |
| 2014/0310059 A1 | 10/2014 | Ellis et al. |

(Continued)

FOREIGN PATENT DOCUMENTS

WO     2014/055028 A1     4/2014

OTHER PUBLICATIONS

Hermine N. Akouemo et al., "Time series outlier detection and imputation", May 2022 (Year: 2022).

*Primary Examiner* — Qing Yuan Wu
(74) *Attorney, Agent, or Firm* — Invoke

(57) ABSTRACT

Techniques for multi-layer forecasting of computational workloads are disclosed. A system identifies a level of granularity associated with a request to forecast a computational workload for a particular entity. The system obtains attribute data of computational resources at the specified level of granularity. The system determines whether computational resources, not specified in the request, should be included in a workload forecast. The system applies a time-series forecast model to time-series data obtained from computational resources associated with the request. The system presents one or more workload forecasts for computational workloads associated with the request.

18 Claims, 13 Drawing Sheets

(56) References Cited

U.S. PATENT DOCUMENTS

| | | |
|---|---|---|
| 2015/0289149 A1 | 10/2015 | Becht et al. |
| 2017/0249562 A1 | 8/2017 | Garvey et al. |
| 2018/0039555 A1 | 2/2018 | Salunke et al. |
| 2018/0300737 A1 | 10/2018 | Bledsoe et al. |
| 2019/0236497 A1 | 8/2019 | Santos et al. |
| 2019/0325328 A1 | 10/2019 | Katz et al. |
| 2020/0082316 A1 | 3/2020 | Megahed et al. |
| 2020/0285503 A1* | 9/2020 | Dou .................. G06F 9/5072 |
| 2020/0401456 A1* | 12/2020 | Sivak ................ G06F 9/45558 |
| 2021/0081492 A1 | 3/2021 | Higginson et al. |

* cited by examiner

MULTI-LAYER FORECASTING OF COMPUTATIONAL WORKLOADS

INCORPORTION BY REFERENCE; DISCLAIMER

Each of the following application is hereby incorporated by reference: application Ser. No. 16/917,821, filed Jun. 30, 2020; application Ser. No. 62/901,088, filed Sep. 16, 2019; application Ser. No. 62/939,603, filed Nov. 23, 2019. The applicant hereby rescinds any disclaimer of claims scope in the parent application(s) or the prosecution history thereof and advise the USPTO that the claims in the application may be broader that any claim in the parent application(s).

The subject matter of this application is related to the subject matter in patented application Ser. No. 10,331,802, entitled "System for Detecting and Characterizing Seasons," having Ser. No. 15/057,065, filing date Feb. 29, 2016, which is hereby incorporated by reference.

The subject matter of this application is related to the subject matter in patented application Ser. No. 10,699,211, entitled "Supervised Method for Classifying Seasonal Patterns in Time Series Data," having Ser. No. 15/057,060 and filing date Feb. 29, 2016, which is hereby incorporated by reference.

The subject matter of this application is related to the subject matter in patented application Ser. No. 10,885,461, entitled "Unsupervised Method for Classifying Seasonal Patterns in Time Series Data," having Ser. No. 15/057,062 and filing date Feb. 29, 2016, which is hereby incorporated by reference.

TECHNICAL FIELD

The present disclosure relates to analyzing time-series data. In particular, the present disclosure relates to techniques for performing time-series analysis for forecasting computational workloads.

BACKGROUND

Applications and data are increasingly migrating from on-premises systems to cloud-based software-as-a-service (SaaS) systems. Within such cloud-based systems, computational resources such as processor, memory, storage, network, and/or disk input/output (I/O) may be consumed by entities and/or components such as physical machines, virtual machines, applications, application servers, databases, database servers, services, and/or transactions.

Cloud service providers typically ensure that the cloud-based systems have enough resources to satisfy customer demand and requirements. For example, the cloud service providers may perform capacity planning that involves estimating resources required to run the customers' applications, databases, services, and/or servers. The cloud service providers may also monitor the execution of the customers' systems for performance degradation, errors, and/or other issues. However, because such monitoring techniques are reactive, errors, failures, and/or outages on the systems can occur before remedial action is taken to correct or mitigate the issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
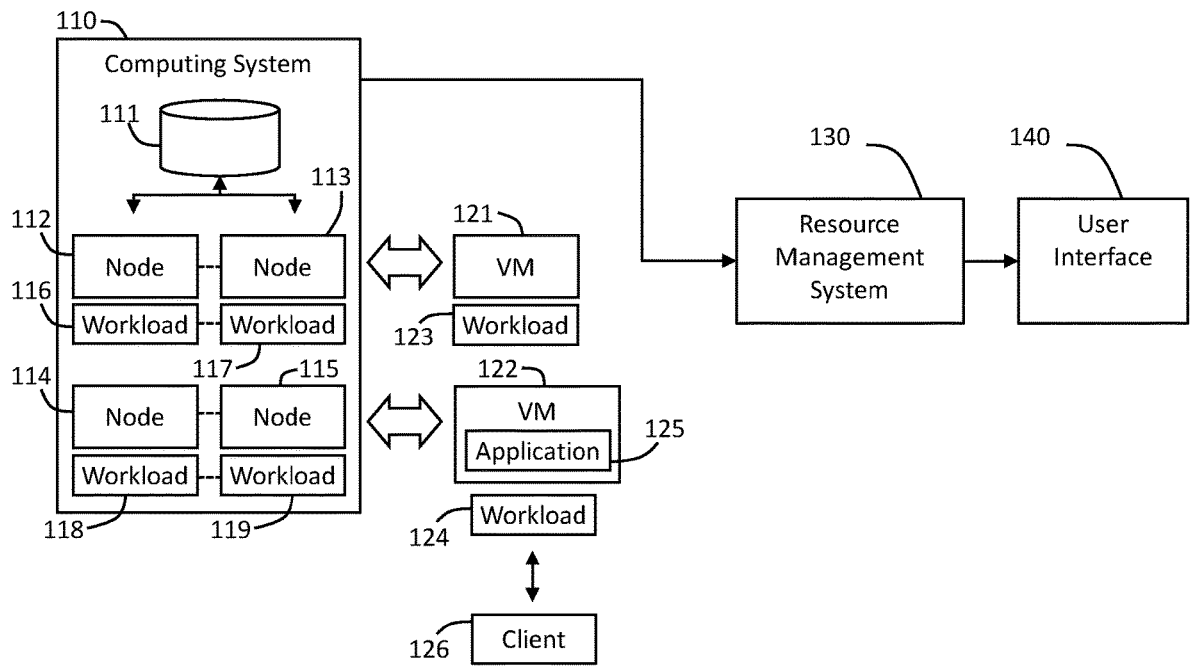
FIGS. 1A-1C illustrate a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MULTI-LAYER FORECASTING OF COMPUTATIONAL WORKLOADS
4. ANOMALY DETECTION USING FORECASTED COMPUTATIONAL WORKLOADS
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

Computing systems include different computing resources. The different computing resources may be capable of operating with a degree of independence from each other. For example, two nodes in a same node cluster may run two independent virtual machines. Although computing resources are capable of operating independently of each other, system events may result in operations of one computing resource affecting operations of another computing resource. For example, frequent access requests by one node of a node cluster to a shared database may result in computational delays of another node which is also attempting to access the shared database. Accordingly, generating workload forecasts in a computing environment to manage computing resources in the environment requires analyzing the computing resources at a sufficient level of granularity to capture the effects the computing resources have on each other.

One or more embodiments apply time-series forecast models to workload data to generate workload forecasts for particular computational entities within a system topology. The workload forecasts capture relationships among computational resources in the system by capturing workload data at particular levels of granularity. Different entities within the topology that make up the system are associated with different computational resource attributes and metrics. For example, a first entity, such as a physical bare-metal server, may utilize resources A, B, and C. A second entity, such as a database, may utilize resources A, D, and E. The first entity (e.g., the physical bare-metal server) may be associated with a relatively high resource utilization rate. The second entity (e.g., the database) may be associated with a relatively low resource utilization rate. Responsive to a request to initiate a workload forecast, a system identifies (a) a level of granularity associated with the request, and (b) the attributes associated with a corresponding entity and the specified level of granularity. A low level of granularity may correspond to a virtual machine utilized by the entity to run applications. A relatively higher level of granularity may correspond to a particular metric, such as a number of processor cores of one or more nodes that (a) host the virtual machine, and (b) affect operation of the node hosting the virtual machine. The system matches the entity attributes to a time-series model trained on historical time-series data for the entity. The system generates the workload forecast by applying the trained time-series model to current time-series data.

One or more embodiments generate a workload forecast for one computational resource, associated with one level of granularity, based on receiving a request to generate a workload forecast for another computational resource associated with another level of granularity. For example, a system may receive a request to generate a workload forecast for a virtual machine. The system identifies computational resources associated with the virtual machine, including a host node which hosts the virtual machine, a sibling node within a same node cluster as the host node, and a shared database accessed by the node cluster. The system identifies a node-level as a level of granularity for generating the workload forecast. The system further determines that the sibling node affects the workload of the host node at a level exceeding a threshold. Accordingly, the system presents, in response to the request, a workload forecast for both the host node and the sibling node. The system generates the workload forecasts by applying a time-series forecast model to attribute data from the host node and the sibling node.

According to one or more embodiments, a system includes a clustered configuration, such as a physical server or a virtual machine, a database server, or a cluster of applications at a software-as-a-service (SaaS) layer. Upon receiving a request to forecast a workload for a host node in a cluster, the system further identifies sibling nodes that affect the workload of the host node at a level exceeding a threshold. Accordingly, the system presents, in response to the request, a workload forecast for both the host node and the sibling node. The system generates the workload forecasts by applying a time-series forecast model to attribute data from the host node and the sibling node. This logic is also applied to any cluster of workloads that consume resources such as a cluster of nodes that serve a database or a cluster of nodes that serve an application both on-premises or cloud based, for example SaaS, DBaaS, PaaS or IaaS.

2. System Architecture

FIG. 1 illustrates a system 100 in accordance with one or more embodiments. As illustrated in FIG. 1, the system 100 includes a computing system 110, application server 120, resource management system 130, and user interface 140.

The computing system 110 is a system being managed by the resource management system 130. The computing system 110 includes one or more data repositories 111 and one or more nodes 112, 113, 114, and 115 configured to interact with the data repository 111, with each other and other nodes, and with an application server 120 to perform workloads. According to one embodiment, the nodes 112-115 are nodes in a node cluster. The node cluster, including nodes 112-115, operate as a group to perform designated tasks. The nodes may be, for example, servers including processors and memory for performing tasks independently of each other. For example, one of the nodes 112-115 may be designated as a master node to receive computing tasks for a workflow and distribute the tasks among the nodes in the cluster. In addition, the nodes 112-115 may run tasks associated with different workflows. For example, each node 112-115 may be assigned to different clients. Node 112 may handle access requests to the data repository 111 from one client. Node 113 may be designated to handle access requests, concurrently with the operation of node 112, to the data repository 111 from another client. A client accessing the node cluster may interface with one server, such as a master node or load balancer. The master node or load balancer distributes data corresponding to assigned workflows to the node corresponding to the assigned workflows. The parallel operation of different nodes within the node cluster allows workloads including high numbers of separate, parallelizable tasks to be distributed among the nodes 112-115 in the cluster. The nodes 112-115 may each include its own processors and local memory. The cluster may be configured to provide fail-over capability, such that one load takes on a workload of another node in the event of a failure. The cluster may be configured to provide load balancing, such that a load balancing server manages the workloads of the respective nodes 112-115 to ensure a specified degree of balance among the loads of the respective nodes 112-115. The computing system 110 may include components of one or more data centers, collocation centers, cloud computing systems, on-premises systems, clusters, content delivery networks, server racks, and/or other collections of processing, storage, network, input/output (I/O), and/or other resources.

As illustrated in FIG. 1A, the computing system 110 runs virtual machines 121 and 122. Each virtual machine 121 and 122 is associated with a respective workload 123 and 124. The workload represents the set of tasks required to perform the functions of the virtual machine 121 or 122. Client 126 accesses the virtual machine 122 via a network. As the client 126 runs the application 125 on the virtual machine 122, the application 125 and any operating system and other applications running on the virtual machine 122 generate the tasks that make up the workload 124. The node 115 hosts the virtual machine 122. The node 115 is associated with the workload 119. The workload 119 includes, for example, the workload 124 associated with the virtual machine 122, as well as any other virtual machines, background applications, and administrative programs running on the node 115. Each node 112-115 is associated with a respective workload 116-119. In one or more embodiments, the operation of one node affects the operation of one or more additional nodes. For example, one node may take on a part or all of another node's workload in the event of a node failure. In addition, one node may have a different hardware set, such as a high number of processing threads, that allows it to complete tasks faster than another node. A leader node or load balancer may redirect tasks from a less-efficient node to a more-efficient node to more efficiently complete tasks assigned to the node cluster. Therefore, if one node is frequently underperforming, it may add a computing burden to a node that has a better overall performance, which may result in tasks congestion and a reduced efficiency for the more efficient node.

In the example illustrated in FIG. 1A, the virtual machine 122 runs an application 125. In operation, a client device 126, such as a personal computer or other computing device, communicates with the computing system 110 including a lead server, master server, or load balancer of the node cluster to run the virtual machine 122. The node 115 designates processing capacity and memory for running the virtual machine 122. The node 115 runs the application 125 on the virtual machine. The client device 126 includes a user interface that gives a user the appearance of running the application 125 on the client device while the application 125 is being run on the node 115. In this manner, the processing capacity of the node 115 is primarily used to run the application 125, while the processing capacity of the client device 126 is used to communicate with the node 115 and display an interface associated with the running application.

Figure 1B:
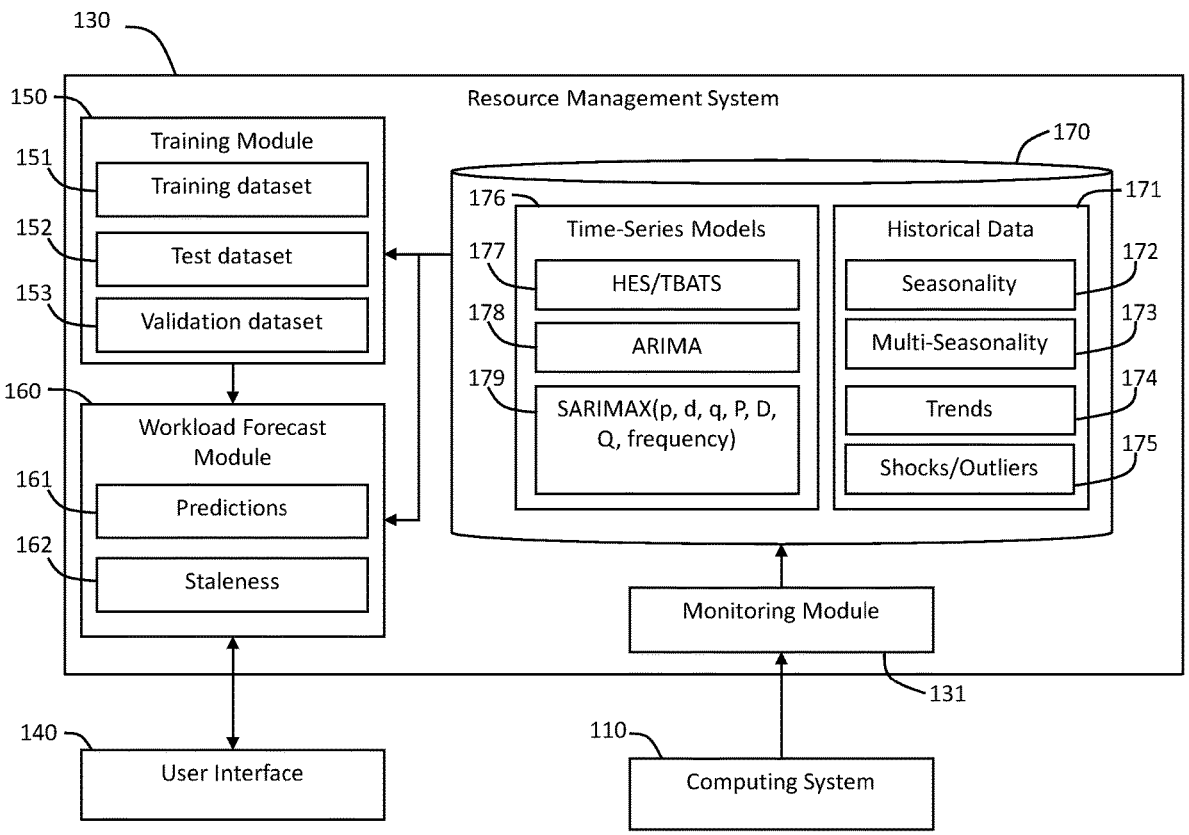

As illustrated in FIG. 1B, the resource management system 130 includes a monitoring module 131 with the functionality to monitor and/or manage the utilization or consumption of resources on the computing system 110. For example, the monitoring module 131 may collect and/or monitor metrics related to utilization and/or workloads on processors, memory, storage, network, I/O, thread pools, and/or other types of hardware and/or software resources. The monitoring module 131 may also, or instead, collect and/or monitor performance metrics such as latencies, queries per second (QPS), error counts, garbage collection counts, and/or garbage collection times on the resources. The monitoring module 131 may be implemented by any set of sensors and/or software-based monitoring applications. According to one example embodiment, the monitoring module 131 is implemented as an agent or program running in a background to other programs running on the computing system 110.

In addition, resource management system 130 may perform such monitoring and/or management at different levels of granularity and/or for different entities. For example, resource management system 130 may assess resource utilization and/or workloads at the environment, cluster, host, virtual machine, database, database server, application, application server, transaction (e.g., a sequence of clicks on a website or web application to complete an online order), and/or data (e.g., database records, metadata, request/response attributes, etc.) level. Resource management system 130 may additionally define an entity using a collection of entity attributes and perform monitoring and/or analysis based on metrics associated with entity attributes. For example, resource management system 130 may identify an entity as a combination of a customer, type of metric (e.g., processor utilization, memory utilization, etc.), and/or level of granularity (e.g., virtual machine, application, database, application server, database server, transaction, etc.). In the example illustrated in FIG. 1A, the system may define an entity as an organization associated with the client device 126. The attributes associated with the entity may include the virtual machines run by the client devices of the organization, the nodes hosting the virtual machines, the applications running on the virtual machines, and the hardware (e.g., processors, processing threads, memory) that make up the nodes hosting the virtual machines. Additional attributes may include applications, node clusters, nodes, databases, processors, memory, and workflows associated with the organization.

The monitoring module 131 stores the metrics related to the workload of the computing system 110 in the data repository 170. The stored metrics make up historical data 171. The historical data 171 includes time-series data and may include one or more of the following characteristics: seasonality 172, multi-seasonality 173, trends 174, and shocks or outliers 175.

The resource management system 130 includes a training module 150 that generates time-series models for various entities associated with the monitored systems using machine learning techniques. The training module 150 obtains the historical time-series data 171 for a given entity (e.g., a combination of a customer, metric, and level of granularity) from the data repository 170. The training module 150 divides the historical time-series data into a training dataset 151, a test dataset 152, and a validation dataset 153. The training module 150 trains a set of time-series models using the training dataset 151 and tests the set of time-series models using the test dataset 152. The training module 150 validates the models using the validation set 153. Based on the training, testing, and validation, the training module 150 generates selections of one or more time-series models for use in evaluating subsequent time-series metrics. The selections of the time-series models may be obtained from the data repository 170.

The resource management system 130 includes a workload forecast module 160 that uses the time-series models generated by the training module 150 to generate forecasts of metrics representing resource consumption and/or workload on the monitored computing system 110. In these embodiments, time-series models analyze time-series data that includes metrics collected from monitored systems to predict future values in the time-series data based on previously observed values in the time-series data.

In one or more embodiments, populated time-series models are stored in the data repository 170 for use in later forecasts. The time-series models 176 include one or more of a Holt-Winters Exponential Smoothing (HES) model and Trigonometric Seasonality Box-Cox ARMA Trend and Seasonal (TBATS) model 177; an Auto-Regressive Integrated Moving Average (ARIMA) model 178, a seasonal ARIMA model with exogenous variables (SARIMAX) 179 having as parameters 154 (p, d, q, P, D, Q, frequency); or any combination of these models or alternative models.

The time-series models 176 include components to account for seasonality, multi-seasonality, trends, and shocks or outliers in the historical time-series data 171. The components of the time-series models 176 also include Fourier terms which are added as external regressors to an ARIMA model 178 or SARIMAX model 179 when multi-seasonality 173 is present in the historical data 171. These components of the time-series models 176 improve the accuracy of the models and allow the models 176 to be adapted to various types of time-series data collected from the monitored systems. In one embodiment, the time-series models 176 include an exogenous variable that accounts for outliers 175 in the historical time-series data 171, to reduce or eliminate the influence the outliers 175 in the model generated with the historical time-series data 171 have on the forecasts of the workload forecast module 160.

In one or more embodiments, the time-series models 176 include one or more variants of an autoregressive integrated moving average (ARIMA) model 178 and/or an exponential smoothing model 177.

In some embodiments, the ARIMA model 178 is a generalization of an autoregressive moving average (ARMA) model with the following representation:

$$Y_t = \sum_{i=1}^{p} \phi_i Y_{t-i} + a_t - \sum_{j=1}^{q} \theta_j a_{t-j}$$

The representation above can be reduced to the following:

$$\emptyset_p(B) Y_t = \theta_q(B) \alpha_t$$

In the above representations, $Y_t$ represents a value Y in a time series that is indexed by time step t, $\phi_1, \ldots, \phi_p$ are autoregressive parameters to be estimated, $\theta_1, \ldots, \theta_q$ are moving average parameters to be estimated, and $\alpha_1, \ldots, \alpha_t$ represent a series of unknown random errors (or residuals) that are assumed to follow a normal distribution.

In one embodiment, the training module 150 utilizes the Box-Jenkins method to detect the presence or absence of stationarity and/or seasonality in the historical time-series data 171. For example, the Box-Jenkins method may utilize an autocorrelation function (ACF), partial ACF, correlogram, spectral plot, and/or another technique to assess stationarity and/or seasonality in the time series.

When the training module 150 determines that only non-stationarity is found, the training module 150 may add a degree of differencing d to the ARMA model to produce an ARIMA model with the following form:

$$\emptyset_p(B)(1-B)^d Y_t = \theta_q(B) \alpha_t$$

When the training module 150 determines that seasonality is found, the training module 150 may add a seasonal component to the ARIMA model to produce a seasonal ARIMA (SARIMA) model with the following form:

$$\emptyset_p(B) \Phi(P)(B^S)(1-B)^d(1-B^S)^D Y_t = \theta_q(B) \Theta_Q(B^S) \alpha_t$$

In the SARIMA model, parameters p, d, and q represent trend elements of autoregression order, difference order, and moving average order, respectively; parameters P, D, and Q represent seasonal elements of autoregression order, difference order, and moving average order, respectively; and parameter s represents the number of seasons (e.g., hourly, daily, weekly, monthly, yearly, etc.) in the time series. $K_i$ In one or more embodiments, the training module 150 applies Fourier terms to the time-series models 176. For example, when multiple seasons are detected in the time series, seasonal patterns may be represented using Fourier terms, which are added as external regressors in the ARIMA model:

$$yt = a + \sum_{i=1}^{M} \sum_{k=1}^{K_i} \left[ \alpha \sin\left(\frac{2\pi k t}{P_i}\right) + \beta \cos\left(\frac{2\pi k t}{P_i}\right) \right] + N_t$$

In the above equation, $N_t$ is an ARIMA process, $P_1, \ldots, P_M$ represent periods (e.g., hourly, daily, weekly, monthly, yearly, etc.) in the time series, and the Fourier terms are included as a weighted summation of sine and cosine pairs.

The time-series models 176 may include exogenous variables that account for outliers 175 in the historical data 171 and represent external effects and/or shocks. In one embodiment, the training module 150 adds the exogenous variable to the ARMAX model, above, to produce an autoregressive moving average model with exogenous inputs (SARMAX) model with the following representation:

$$Y_t = \sum_{i=1}^{p} \phi_i Y_{t-i} + \sum_{k=1}^{r} \beta_k X_{t-k} + \varepsilon_t + \sum_{j=1}^{q} \theta_j a_{t-j}$$

In the above representation, $\beta_1, \ldots, \beta_r$ are parameters of time-varying exogenous input X. In additional embodiments, the training module 150 includes an exogenous variable in the ARIMA and/or SARIMAX models. In a computing system 110, the exogenous variable may represent system backups, batch jobs, periodic failovers, and/or other external factors that affect workloads, resource utilizations, and/or other metrics in the time series. These external factors may cause spikes in a workload metric that do not follow an underlying seasonal pattern of the historical time-series data 171.

In one or more embodiments, the exponential smoothing model includes a trigonometric seasonality Box-Cox ARMA Trend Seasonal components (TBATS) model. The TBATS model includes the following representation:

$$y_t^{(\lambda)} = l_{t-1} + \Phi \cdot b_{t-1} + \sum_{i=1}^{T} s_{t-m_i}^{(i)} + d_t$$

$$l_t = l_{t-1} + \Phi \cdot b_{t-1} + \alpha \cdot d_t$$

$$b_t = \Phi \cdot b_{t-1} + \beta \cdot d_t$$

$$d_t = \sum_{i=1}^{p} \varphi_i \cdot d_{t-i} + \sum_{i=1}^{q} \theta_i \cdot e_{t-i} + e_t$$

In the above representation, T is the number of seasonalities, $m_i$ is the length of the ith seasonal period, $\gamma_t^{(\lambda)}$ is the time series Box-Cox transformed at time t, $s_t^{(i)}$ is the ith seasonal component, $l_t$ is the level, $b_t$ is the trend with damping effect, $d_t$ is an ARMA(p, q) process, and $e_t$ is Gaussian white noise with zero mean and constant variance. In addition, $\Phi$ is a trend damping coefficient, $\alpha$ and $\beta$ are smoothing coefficients, and $\varphi$ and $\theta$ are ARMA(p, q) coefficients.

The seasonal components of the TBATS model are represented using the following:

$$s_t^{(i)} = \sum_{j=1}^{k_i} s_{j,t}^{(i)}$$

$$s_{j,t}^{(i)} = s_{j,t-1}^{(i)} \cdot \cos(\lambda_i) + s_{j,t-1}^{*(i)} \cdot \sin(\lambda_i) + \gamma_1^{(i)} \cdot d_t$$

$$s_{j,t}^{*(i)} = -s_{j,t-1}^{(i)} \cdot \sin(\lambda_i) + s_{j,t-1}^{*(i)} \cdot \cos(\lambda_i) + \gamma_2^{(i)} \cdot d_t$$

$$\lambda_i = \frac{2 \cdot \pi \cdot j}{m_i}$$

In the above equations, $k_i$ is the number of harmonics required for the ith seasonal period, $\lambda$ is the Box-Cox transformation, and $\gamma_1^{(i)}$ and $\gamma_2^{(i)}$ represent smoothing parameters.

Thus, the TBATS model has parameters 154 T, $m_i$, $k_i$, $\lambda$, $\alpha$, $\beta$, $\varphi$, $\theta$, $\gamma_1^{(i)}$, and $\gamma_2^{(i)}$. The final model can be chosen using the Akaike information criterion (AIC) from alternatives that include (but are not limited to):
- with and without the Box-Cox transformation
- with and without trend
- with and without trend damping
- with and without ARMA(p, q) process to model residuals
- with and without seasonality
- variations in the number of harmonics used to model seasonal effects Referring to FIG. 1C, in one or more embodiments, resource management system 130 includes a training module 150 that generates time-series models 176 for various entities associated with the monitored systems using supervised learning techniques. First, training module 150 obtains historical time-series data for a given entity (e.g., a combination of a customer, metric, and level of granularity) from a data repository 170. For example, training module 150 may match entity attributes 157 for the entity to records storing historical time-series data for the entity in a database (e.g., metrics collected from the entity over the past week, month, year, and/or another period). Each record may include a value of a metric, a timestamp representing the time at which the value was generated, and/or an index representing the position of the value in the time series.

Next, training module 150 divides the historical time-series data into a training dataset 151 and a test dataset 152. For example, training module 150 may populate training dataset 151 with a majority of the time-series data (e.g., 60-80%) and test dataset 152 with the remainder of the time-series data. In some embodiments, training module 150 selects the size of test dataset 152 to represent the forecast horizon of each time-series model, which depends on the granularity of the time-series data. For example, training module 150 may include, in test dataset 152, 24 observations per metric spanning a day for data that is collected hourly (corresponding to one or more thousands of observations for a week-duration data set made up of hourly observations of multiple metrics); seven observations spanning a week for data that is collected daily; and/or four observations spanning approximately a month for data that is collected weekly. Training module 150 optionally uses a cross-validation technique to generate multiple training datasets and test datasets from the same time-series data.

Training module 150 uses training dataset 151 to train a set of time-series models 176 with different parameters 154. For example, training module 150 uses the Box-Jenkins method and/or another method to generate a search space of parameters 154 for various ARIMA-type models (including SARIMA, ARIMAX, and/or SARIMAX) and/or TBATS-type models. Training module 150 then uses a maximum likelihood estimation (MLE) technique, ordinary least squares (OLS) technique, and/or another technique to fit each model to training dataset 151.

After a set of time-series models 176 is created from training dataset 151, training module 150 uses test dataset 152 to evaluate the performance of each model. In particular, training module 150 uses time-series models 176 to generate predictions 155 of values in test dataset 152, based on previously observed values in the time-series data. Training module 150 also determines accuracy values 156 of time-series models 176 based on comparisons of predictions 155 and the corresponding values of test dataset 152. For example, training module 150 calculates a mean squared error (MSE), root MSE (RMSE), AIC, and/or another measure of model quality or accuracy between predictions 155 and corresponding test dataset 152 values for all time-series models 176 generated from historical time-series data for the entity.

Finally, training module 150 generates selections 158 of one or more time-series models 176 for use in evaluating subsequent time-series metrics for the same entity, or for an entity with attributes 157 that are similar within a threshold level of similarity. For example, training module 150 includes, in selections 158, one or more time-series models 176 with the highest accuracy values 156 in predicting values in test dataset 152.

After one or more best-performing time-series models 176 are selected for one or more entities, training module 150 stores parameters of each model in a model repository, such as in the data repository 170. Training module 150 also, or instead, provides a representation of the model to a monitoring module 131, user interface 140, and/or other components of resource management system 130.

The workload forecast module 160 obtains a time series of recently collected metrics for each entity from the data repository 170 and inputs the data into the corresponding time-series model 176 generated by the training module 150. In turn, the time-series model 176 outputs predictions 161 of future values in the time series as a predicted workload, resource utilization, and/or performance associated with the entity.

The monitoring module 131 includes functionality to predict anomalies based on comparisons of forecasts generated by the workload forecast module 160 with corresponding thresholds. For example, thresholds may represent limits on utilization of resources by the entities and/or service level objectives for performance metrics associated with the entities. When a forecasted metric violates (e.g., exceeds) a corresponding threshold, monitoring module 131 may detect a potential future anomaly, error, outage, and/or failure in the operation of hardware and/or software resources associated with the entity. For example, the entity within a topology that makes up a system may suffer a fault that is reflected in the time-series data as a spike or growth/trend. The prediction from the models can pick up this sudden change in resource utilisation that is reflected to the user identifying a "change" in usage that requires investigation.

When an anomaly is predicted in metrics for a given entity, monitoring module 131 communicates the predicted anomaly to one or more users involved in managing use of the monitored systems by the entity. For example, monitoring module 131 may include a graphical user interface (GUI), web-based user interface, mobile user interface, voice user interface, and/or another type of user interface that displays a plot of metrics as a function of time. The plot additionally includes representations of one or more thresholds for metrics and/or forecasted values of metrics from a time-series model for the corresponding entity. When the forecasted values violate a given threshold, the user interface displays highlighting, coloring, shading, and/or another indication of the violation as a prediction of a future anomaly or issue in the entity's use of the monitored systems. In another example, monitoring module 131 may generate an alert, notification, email, and/or another communication of the predicted anomaly to an administrator of the monitored systems to allow the administrator to take preventive action (e.g., allocating and/or provisioning additional resources for use by the entity before the entity's resource utilization causes a failure or outage).

The workload forecast module 160 includes a staleness determining module 162 that performs a recurring analysis of the selected models to determine whether the models are stale. After a period has lapsed since a given time-series model has been trained, used to generate forecasts, and/or predict anomalies, training module 150 retrains the time-series model using more recent time-series data from the corresponding entity. For example, training module 150 may regularly obtain and/or generate a new training dataset 151 and test dataset 152 from metrics collected over a recent number of days, weeks, months, and/or another duration. Training module 150 may use the new training dataset 151 to generate a set of time-series models 176 with different combinations of parameter values and evaluate accuracies of the generated time-series models 176 using the new test dataset 152. Training module 150 may then select one or more of the most accurate and/or highest performing time-series models for inclusion in model repository and/or for use by monitoring module 131 in generating forecasts and/or predicting anomalies for the entity over the subsequent period.

By forecasting resource utilizations, computational workloads, and/or other metrics related to the use of monitored systems by entities, resource management system 130 allows potential errors, failures, and/or outages in the monitored systems to be prevented, which reduces downtime in the monitored systems and/or improves the execution of applications, databases, servers, virtual machines, physical machines, and/or other components on the monitored systems. The forecasting of metrics at different levels of granularity and/or layers of technology in the monitored systems additionally allows the usage of resources by the entities to be more accurately characterized, which reduces inefficient allocation of the resources to the entities and/or inefficient provisioning of resources to meet the entities' requirements. Consequently, the system of FIGS. 1A-1C may improve the use of technologies and/or computer systems for monitoring, managing, and/or allocating computational resources.

Figure 1C:
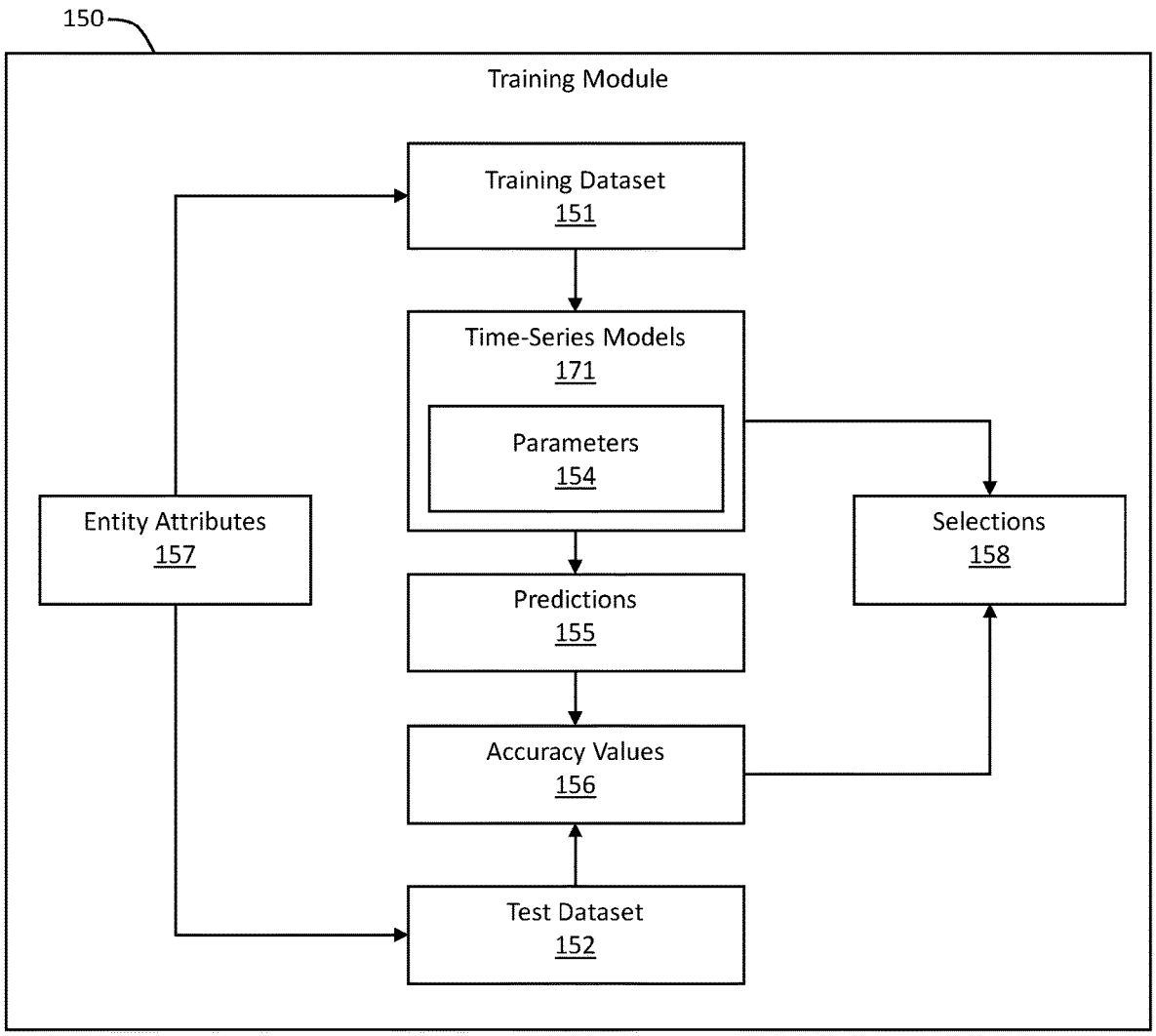

In one or more embodiments, resource management system 130 may include more or fewer components than the components illustrated in FIGS. 1A-1C. For example, training module 150 and monitoring module 131 may include, execute with, or exclude one another. The components illustrated in FIGS. 1A-1C may be local to or remote from each other. The components illustrated in FIGS. 1A-1C may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository (e.g., data repository 170) is any type of storage unit and/or device (e.g., a file system, database, collection of tables, or any other storage mechanism) for storing data. The data repository may be implemented or may execute on the same computing system as training module 150, workload forecast module 160, and monitoring module 131 or on a computing system that is separate from training module 150, workload forecast module 160, and monitoring module 131. The data repository may be communicatively coupled to the training module 150, workload forecast module 160, and monitoring module 131 via a direct connection or via a network. Further, the data repository may include multiple different storage units and/or devices. The multiple different storage units and/or devices may or may not be of the same type or located at the same physical site.

In one or more embodiments, resource management system 130 refers to hardware and/or software configured to perform operations described herein for forecasting computational workloads. Examples of such operations are described below.

In an embodiment, resource management system 130 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, a user interface 140 refers to hardware and/or software configured to facilitate communications between a user and resource management system 130. The user interface 140 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the user interface 140 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface is specified in one or more other languages, such as Java, C, or C++.

3. Multi-Layer Forecasting of Computational Workloads

Figure 2:
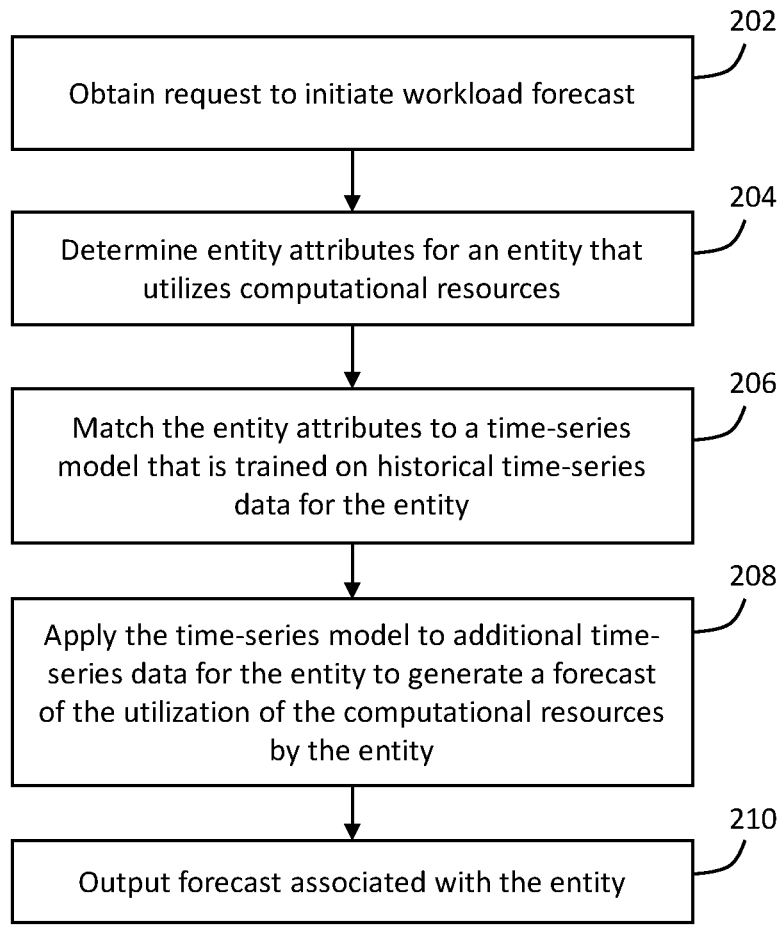
FIG. 2 illustrates an example set of operations for multi-layer forecasting of workloads in accordance with one or more embodiments.

FIG. 2 illustrates an example set of operations for multi-layer forecasting of computational workloads in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

The system determines entity attributes for an entity that utilizes computational resources (operation 204). For example, the entity attributes may be retrieved from a data repository and/or received in a request. The entity attributes may include a level of granularity associated with components utilizing the computational resources (e.g., virtual machine, database, application, application server, database server, transaction, etc.), a metric representing the utilization of the computational resources (e.g., processor, memory, network, I/O, storage, and/or thread pool usage), and/or a user or organization representing a customer or owner of the components. The entity attributes may describe a topology associated with a particular workload at a specified level of granularity.

For example, the system may receive a request to perform workload forecasting for a particular virtual machine. The request may specify a node-type level of granularity. In other words, the system identifies any nodes associated with the performance of the virtual machine and initiates the forecast operation by analyzing workloads of the nodes. Responsive to the request and the specified level of granularity, the system may identify (a) a target node hosting the target virtual machine, and (b) a sibling node that is part of the same node cluster as the target node. According to an alternative embodiment, the request may specify a processing component level of granularity. Accordingly, the system may identify attributes of processor-cores and memory access requests associated with processors and memory of nodes supporting a particular virtual machine workload. Determining the entity attributes may include (a) identifying workloads of the target node and the sibling node, and (b) determining hardware, such as CPU attributes, processor-core attributes, and memory attributes associated with both the target node and the sibling node. According to one or more embodiments, the system determines a level of granularity for analyzing and forecasting workloads based on settings associated with forecast operations. The level of granularity may be specified in a request generated by a user via a user interface, it may be specified in stored settings associated with particular users, particular nodes, particular node clusters, and/or particular virtual machines.

The entity attributes are matched to a time-series model that is trained on historical time-series data for the entity (operation 206). For example, the entity attributes may be used as keys in a lookup of the time-series model in a model repository and/or an environment in which the time-series model is deployed. As an example, a set of entity attributes may describe the entity topology at a particular level of granularity, such as: 4 nodes of a node cluster, each node including 8 processors, 3 nodes including processors of type A with X number of processor cores each, 1 node including processors of type B with Y number of processor cores each. Another, more generalized, level of granularity associated with an entity topology may include: 1 node running a virtual machine and accessing a database of a type D and 1 sibling node in the same node cluster. The system compares a specified topology with stored topologies associated, respectively, with stored time-series models trained on historical time-series data for the respective topologies.

The time-series model is then applied to additional time-series data for the entity to generate a forecast of the utilization of the computational resources by the entity (operation 208). For example, recently collected utilization metrics for the entity are inputted into the time-series model, and the time-series model generates output representing predictions of future values for the utilization metrics.

The forecast is output in association with the entity (operation 210). For example, the predicted future values may be displayed and/or outputted in a chart, table, log, file, and/or other representation. In turn, a representative of the entity and/or a manager of the computational resources can use the predicted future values to adjust allocation of resources to the entity and/or provision additional resources in anticipation of increased workload on the resources.

Operations 202-208 may be repeated for remaining entities that utilize the computational resources. For example, a time-series model may be retrieved for each entity that utilizes resources in a cloud and/or distributed system, and a forecast of the entity's resource utilization is generated and outputted to facilitate subsequent management, allocation, and/or provisioning of the resources.

Figure 3:
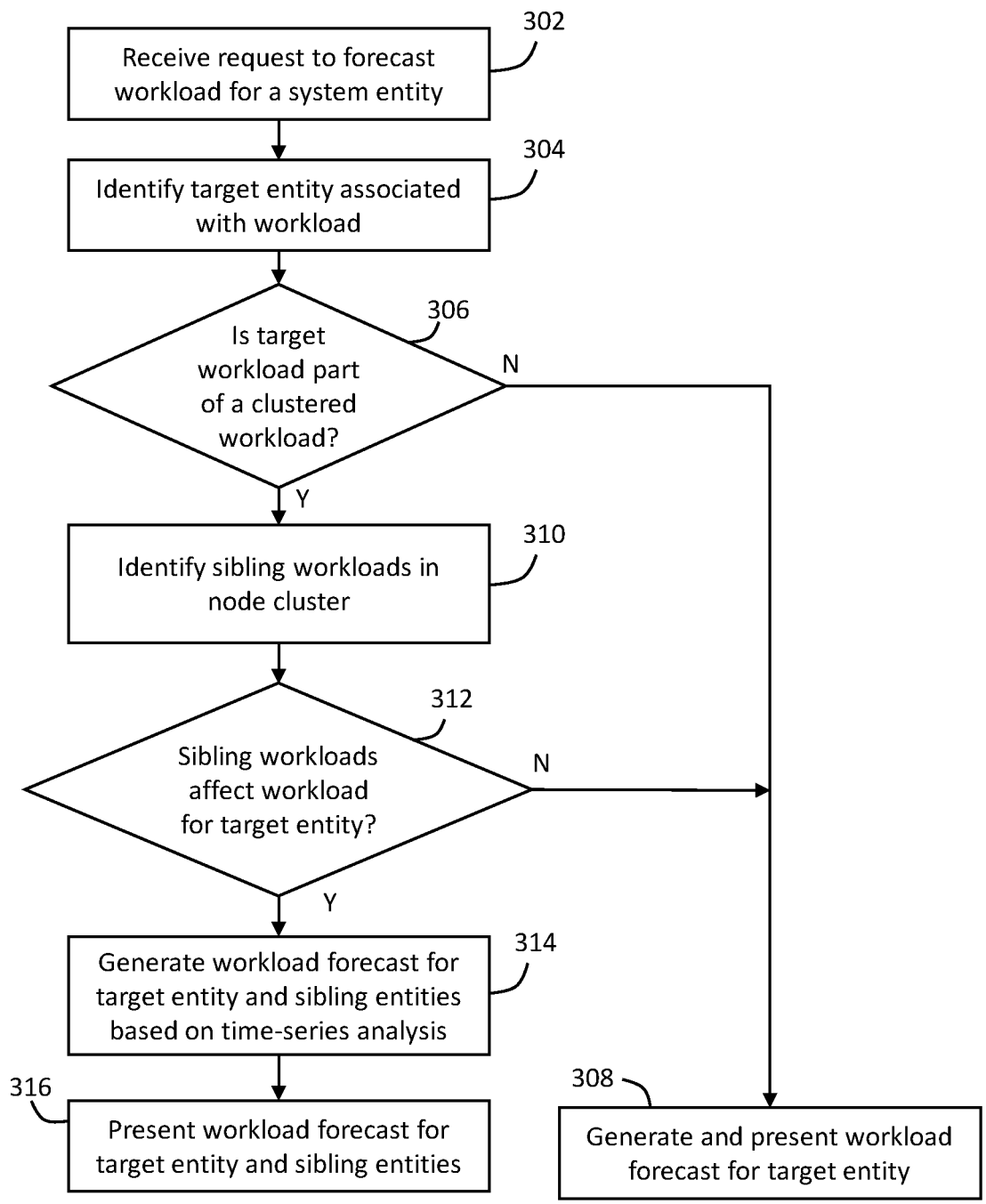
FIG. 3 illustrates an example set of operations for forecasting workloads in a multi-node cluster environment in accordance with one or more embodiments.

FIG. 3 illustrates an example set of operations for multi-layer forecasting of workloads for entities in a system in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

A system receives a request to forecast a workload for a particular system entity (Operation 302). A system entity includes a particular set of system computational resources at a particular level of granularity. Examples of system entities include: a virtual machine, a node hosting the virtual machine, a node cluster to which the host node belongs, hardware and software executing tasks to execute workflows, a database, a node cluster supporting a database, applications, and clusters of nodes supporting one or more applications.

In an example embodiment in which the entity is a virtual machine, as the virtual machine operates on an underlying node or server, it generates a workload of tasks for processing and memory components to perform. The system obtains a request to forecast characteristics of the workload for the virtual machine in the future. For example, the forecast may include a bandwidth utilized on network infrastructure, processing and CPU utilization, requests to memory, and access requests to shared resources, such as a database accessible by the target node and one or more additional nodes.

The system identifies a target entity associated with the workload identified in the forecast request (Operation 304). The target entity is associated with a level of granularity associated with the forecast request. For example, the forecast request may include a request to forecast a workload for a virtual machine. The request may be associated with a level of granularity specifying attributes of servers in a server cluster hosting the virtual machine. The system may determine that the virtual machine is maintained by a particular node of a node cluster. While from the perspective of a client device, requests are transmitted to a particular address associated with a leader node in the node cluster, or with a load balancer, the system identifies as a target entity associated with the forecast request the particular node in the cluster to which the lead node or load balancer directs the requests.

The system determines whether the target workload identified in the forecast request is part of a clustered workload (Operation 306). A clustered workload is a workload that is executed by one or more nodes in a cluster of nodes. Each of the one or more nodes may execute separate workloads. The separate workloads may correspond to tasks of a same workload or tasks of different workloads. For example, one node may execute a workload associated with one virtual machine. Another node may execute a workload associated with a different virtual machine. Alternatively, two nodes may execute workloads that are part of the same virtual machine workload.

If the system determines that the target workload is not part of a workload cluster, the system generates a workload forecast for the target workload in response to the request to generate a forecast for the target entity workload (Operation 308). The system generates the forecast for the target workload by applying a time-series model trained on a set of attributes associated with the target entity to time-series attribute data from the target entity. The system generates a forecast for the target entity that includes not only a forecast based on predicted workload attributes for a requested workload associated with the target entity, but also predicted workload attributes for any other operations performed by the target entity. For example, if the target entity is a node hosting a virtual machine, the system generates the forecast for the node that includes not only a forecast based on predicted workload attributes for a requested workload associated with the virtual machine, but also predicted workload attributes for any other operations performed by the node that hosts the virtual machine.

A particular node may host multiple virtual machines corresponding to one or more tenants. For example, a server may be partitioned to provide different tenants with access to computing and/or memory resources. The partition may designate particular processing and/or memory resources for different tenants at all times. Alternatively, the partition may include temporal specifications to allow tenants to access shared resources as different times. One tenant may be granted access to a set of processing resources at one period of time, and another tenant may be granted access to the same set of processing resources at another period of time. In addition to virtual machines, a node may provide access to operating systems and applications. The operating systems and applications may be provided to external client devices as part of, or separate from, virtual machines. Accordingly, the operations of other applications performed by the node, such as workflows associated with additional virtual machines, affect a target workload associated with a target virtual machine. According to one example, the system generates and presents (a) the forecast for the target workload associated with a target virtual machine, and (b) at least one additional forecast associated with at least one additional workload associated with at least one additional virtual machine hosted by the target node.

If the system determines that the target workload is part of a workload cluster, the system identifies additional workloads in the workload cluster (Operation 310). The workload cluster may comprise a set of workloads executed by two or more nodes in a node cluster. The two or more nodes include, for example, servers having separate processors and memory and capable of executing workloads independently of each other. The system may determine a relationship between the target workload and any additional workloads in the workload cluster. For example, the system may determine whether the nodes executing the workloads communicate with each other. The system may determine whether the nodes executing the workloads access a same set of shared resources. The system may determine whether one node is designated to take over tasks of another node in the event of a failure. The system may identify any leader nodes in the node cluster executing a workload cluster. The system may further identify any load balancer that distributes requests among nodes in the cluster executing the workload cluster.

According to one embodiment, the system analyzes time-series data for the target entity associated with the target workload and one or more sibling entities associated with sibling workloads to identify an extent to which execution of the sibling workloads affects execution of the target workload (Operation 312). For example, a sibling node in a node cluster may be susceptible to frequent communication failures which may result in periodic workflow increases to a target node as a leader node redirects tasks from the sibling node to the target node. In addition, a sibling node performing frequent access requests to a shared database to execute a sibling workload may result in delays for the target node attempting to access the shared database for the target workload. The system may determine whether the effect of a sibling workload on a target workload exceeds a threshold value. For example, the system may calculate whether, based on historical time-series data, characteristics or events associated with a sibling workload degrade performance of the target workload by more than 10% at least once in a specified period of time (such as one day, one week, one month).

If the system determines that a sibling workload does not affect operation of the target workload beyond a threshold level, the system generates and presents a workload forecast for the target workload without generating a workload forecast for the sibling workloads (Operation 308). As described in connection with FIG. 2, generating a workload forecast includes selecting a time-series forecasting model based on entity attributes, or in other words, an entity topology. Generating the workload forecast for the target workload without generating the workload forecast for the sibling workloads may include omitting the sibling node(s) in a node cluster executing a clustered workload from the entity attributes when selecting the time-series forecasting model.

If the system determines that a sibling workload does affect operation of the target workload beyond a threshold level, the system generates a workload forecast for the target workload for the sibling workloads (Operation 314). Generating the workload forecast for the target workload and for the sibling workload includes obtaining entity attributes for a target entity associated with the target workload and for sibling entities associated with the sibling workloads. For example, the system may generate a separate forecast for each of a target node and sibling nodes in a node cluster executing a workload cluster. Presenting separate forecasts provides a visual indicator of the relationship between the sibling node workflows and the target node workflow. According to an alternative embodiment, generating the workload forecast for the target workload and for the sibling workloads includes generating a single forecast based on the combined entity attributes of the target entity and the sibling entities. As described in connection with FIG. 2, generating a workload forecast includes selecting a time-series forecasting model based on entity attributes, or in other words, an entity topology. In the example embodiment in which the target entity is a node hosting a virtual machine, generating the workload forecast for the target entity and for the sibling entities includes generating a workflow forecast for the target node based on entity attributes associated with the target node, and generating a workflow forecast for at least one sibling node based on entity attributes associated with the sibling node. While the target node and sibling node may share some entity attributes—such as attributes of shared resources and interconnected leader nodes or load balancers—other entity attributes are particular to the respective target node and sibling node. For example, the target node has a particular configuration of processors and memory that is separate from that of the sibling node. Accordingly, the system may select one time-series forecasting model to forecast the workflow for the target node and another time-series forecasting model to forecast the workflow for the sibling node.

The system presents a workload forecast for the target entity and the one or more sibling entities (Operation 316). For example, the predicted future values may be displayed and/or outputted in a chart, table, log, file, and/or other representation. In turn, a representative of the entity and/or a manager of the computational resources can use the predicted future values to adjust allocation of resources to the entity and/or provision additional resources in anticipation of increased workload on the resources.

3. Time-Series Analysis for Forecasting Computational Workloads

Figure 4:
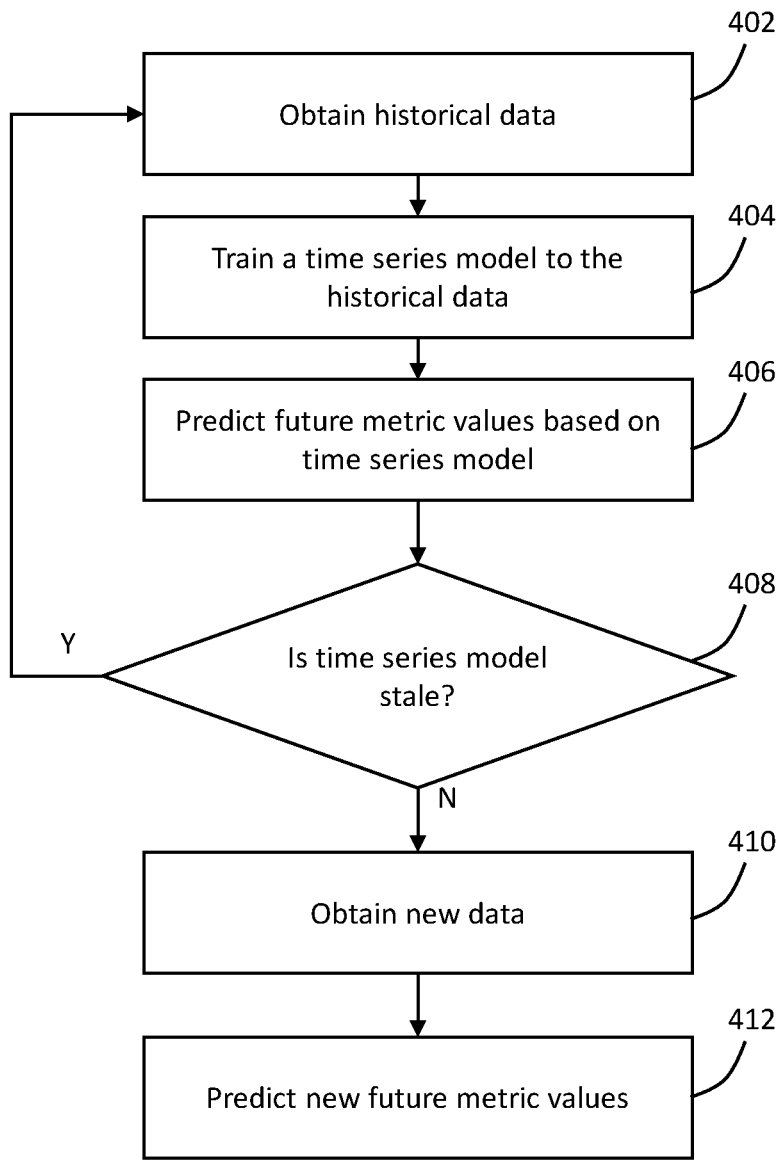
FIG. 4 illustrates an example set of operations for determining data staleness while performing time-series analysis in accordance with one or more embodiments.

FIG. 4 is an example set of operations for performing time-series analysis for forecasting computational workloads in accordance with one or more embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a resource management system for a monitored system obtains historical time-series data containing metrics collected from the monitored system (Operation 402). The resource management system may obtain the historical time-series data for a given entity (e.g., a combination of a customer, metric, and level of granularity) from a data repository. For example, a resource management system may match entity attributes for an entity to records storing historical time-series data for the entity in a database (e.g., metrics collected from the entity over the past week, month, year, and/or another period). Each record may include a value of a metric, a timestamp representing the time at which the value was generated, and/or an index representing the position of the value in the time series.

The resource management system trains at least one time-series model to the historical data (Operation 404).

Figure 5:
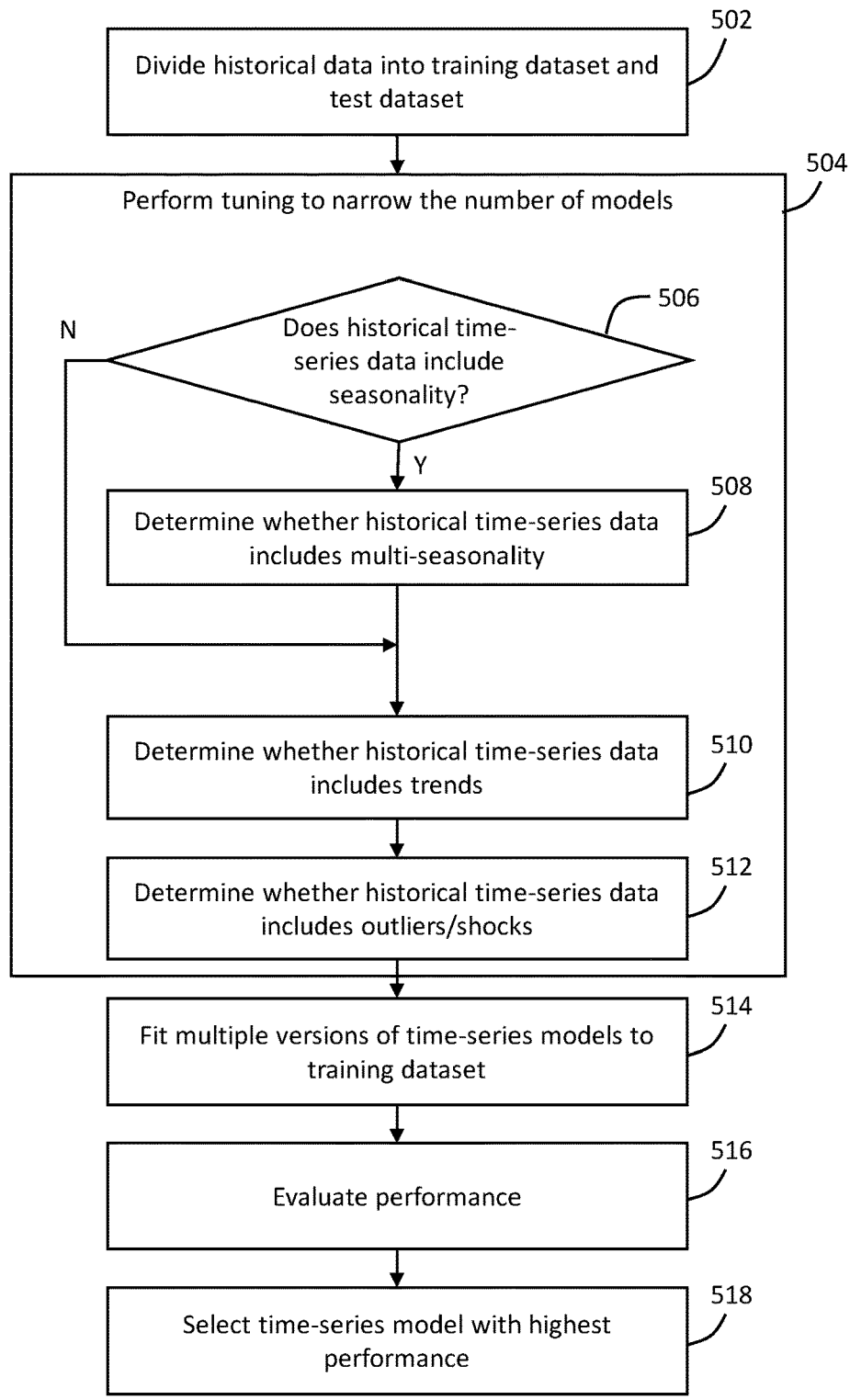
FIG. 5 illustrates an example set of operations for training time-series models in accordance with one or more embodiments.

FIG. 5 illustrates a process by which the resource management system trains a time-series model to historical data. In one or more embodiments, one or more of the steps may be omitted, repeated, and/or performed in a different order. Accordingly, the specific arrangement of steps shown in FIG. 5 should not be construed as limiting the scope of the embodiments.

The resource management system divides the historical time-series data into a training dataset and a test dataset to train a set of time-series modes (Operation 502). For example, the resource management system may populate training dataset with a majority of the time-series data (e.g., 70-80%) and a test dataset with the remainder of the time-series data. In some embodiments, the resource management system selects the size of test dataset to represent the forecast horizon of each time-series model, which depends on the granularity of the time-series data. For example, the resource management system may include, in test dataset, 24 observations spanning a day for data that is collected hourly; seven observations spanning a week for data that is collected daily; and/or four observations spanning approximately a month for data that is collected weekly. The resource management system optionally uses a cross-validation technique to generate multiple training datasets and test datasets from the same time-series data.

The resource management system performs a tuning operation to narrow down the number of models to be analyzed (Operation 504). In one embodiment, the resource management system utilizes an autocorrelation function (ACF) or partial autocorrelation function (PACF) to find a number of autoregressive terms to be used by the time-series models. For example, using an autocorrelation function, a set of time-series data is copied and the copy is adjusted to lag the original set of time-series data. By comparing the original set of time-series data with multiple copies having different lag times, the system identifies a sets of parameter values for time-series models that are likely to result in the most accurate predictions.

By performing the tuning operation, the resource management system determines whether the historical data includes seasonal patterns (Operation 506), multi-seasonal patterns (Operation 508), trends (Operation 510), and outliers or shocks (Operation 512). Based on the identified characteristics of the historical time-series data, the resource management system selects particular time-series models that are likely a good fit for the historical data. For example, a system may compute the ACF/PACF and identify which parameters for time-series models are most likely to result in accurate forecasts. Accordingly, the ACF and/or PACF calculations filter to reduce a number of iterations of time-series model parameters the system tests to predict future workflow values. This filtering technique reduces the parameters of the time series models (p, d, q, P, D, Q, f) and their combinations of the SARIMAX-type model, to be trained to the historical data. The system may select from among multiple different types of models to be trained to the historical data, and different types of models may be fit to the training dataset to be evaluated. For example, the system may compute the ACF/PACF and determine that both an ARIMA-type model and a SARIMAX-type model have a similar likelihood of being a fit for the historical data. This automation reduces the overall time it takes to compute and perform the predictions.

Upon identifying one or more types of models as being a possible fit for the historical data, the resource management system fits multiple versions of the selected time-series models to the training dataset (Operation 514). Specifically, the resource management system uses the training dataset to train a set of time-series models with different parameters (Operation 516). For example, the system may use the Box-Jenkins method and/or another method to generate a search space of parameters for various ARIMA-type models and/or TBATS-type models. In an embodiment in which an ARIMA-type model is selected to be fit to the training dataset, parameters (p, d, q) are present and the resource management system uses different values for the parameters to identify the search space of the parameters. The resource management system then uses a maximum likelihood estimation (MLE) technique, ordinary least squares (OLS) technique, and/or another technique to fit each model to the training dataset.

After the resource management system creates a set of time-series models from the training dataset, the resource management system uses test dataset to evaluate the performance of each model (Operation 516). In particular, the resource management system uses time-series models to generate predictions of values in test dataset, based on previously observed values in the time-series data. The resource management system also determines accuracies of time-series models based on comparisons of predictions and the corresponding values of test dataset. For example, the resource management system calculates a mean squared error (MSE), root MSE (RMSE), AIC, and/or another measure of model quality or accuracy between predictions and corresponding test dataset values for all time-series models generated from historical time-series data for the entity.

In one embodiment, the time-series models include exogenous variables to account for spikes or outliers in the historical data. In one embodiment, future data points predicted by the time-series models do not incorporate any influence of the exogenous variable. In an alternative embodiment, future data points predicted by the time-series model incorporate an influence of the exogenous variable by accepting as input a value for the exogenous variable. In addition, or in the alternative, in one embodiment, the time-series model incorporates an influence of the exogenous variable on future data points predicted by the first time-series model by reducing a weight given to the exogenous variable relative to other variables in the first time-series model representing a seasonality pattern in the historical data.

In one embodiment, the resource management system utilizes Fourier transforms of the time-series model to determine the accuracy of the time-series models. The resource management system may apply Fourier transforms to the time-series models to compare the time-series models to the test dataset to determine the accuracy of the respective time-series models.

Finally, the resource management system generates selections of one or more time-series models for use in evaluating subsequent time-series metrics for the same entity (Operation 518). For example, the resource management system includes, in the selections, one or more time-series models with the highest accuracies in predicting values in test dataset.

After one or more best-performing time-series models are selected for one or more entities, the resource management system stores parameters of each model in a model repository. The resource management system also, or instead, provides a representation of the model to a monitoring module, a user interface, and/or other components of resource management system. In one or more embodiments, the best-performing time-series models include components to account for seasonality, multi-seasonality, and shocks or outliers in the historical time-series data. These components of the time-series models improve the accuracy of the models and allow the models to be adapted to various types of time-series data collected from the monitored systems. In one embodiment, the time-series models include an exogenous variable that accounts for outliers in the historical time-series data, so that the outliers in the model generated with the historical time-series data do not affect values of the metrics in forecasts of the resource management system.

In one embodiment, the resource management system applies a Fourier transform to the time-series models. For example, when multiple seasons are detected in the time series, seasonal patterns may be represented using Fourier terms.

Returning to FIG. 4, in one or more embodiments, a system uses selected time-series models to generate forecasts of time-series metrics (Operation 406). For example, the system may forecast workloads and/or utilizations related to processor, memory, storage, network, I/O, thread pools, and/or other types of resources in the monitored systems.

To produce forecasts, the system inputs a time series of recently collected metrics for each entity into the corresponding time-series model. In turn, the time-series model outputs predictions of future values in the time series as a predicted workload, resource utilization, and/or performance associated with the entity.

The system may additionally include functionality to predict anomalies based on comparisons of forecasts with corresponding thresholds. For example, thresholds may represent limits on utilization of resources by the entities and/or service level objectives for performance metrics associated with the entities. When a forecasted metric violates (e.g., exceeds) a corresponding threshold, the system may detect a potential future anomaly, error, outage, and/or failure in the operation of hardware and/or software resources associated with the entity.

When an anomaly is predicted in metrics for a given entity, the system communicates the predicted anomaly to one or more users involved in managing use of the monitored systems by the entity. For example, the system may include a graphical user interface (GUI), web-based user interface, mobile user interface, voice user interface, and/or another type of user interface that displays a plot of metrics as a function of time. The plot additionally includes representations of one or more thresholds for metrics and/or forecasted values of metrics from a time-series model for the corresponding entity. When the forecasted values violate a given threshold, the user interface displays highlighting, coloring, shading, and/or another indication of the violation as a prediction of a future anomaly or issue in the entity's use of the monitored systems. In another example, monitoring module may generate an alert, notification, email, and/or another communication of the predicted anomaly to an administrator of the monitored systems to allow the administrator to take preventive action (e.g., allocating and/or provisioning additional resources for use by the entity before the entity's resource utilization causes a failure or outage).

The system continually monitors the time-series models used to predict future metrics for an entity to determine whether the models are stale (Operation 408). The system determines that a time-series model is stale if its error rate exceeds a predetermined threshold or if a predetermined period has elapsed. According to one embodiment, the system determines that a time-series model is stale if a root mean squared error (RMSE) falls below 95% accuracy. Alternative embodiments encompass any desired level of accuracy of the time-series model. In addition, or in the alternative, the system may determine that the time-series model is stale if more than one week has elapsed since it was trained. While a week is provided as an example of a time-table for determining if a time-series model is stale, embodiments encompass any period of time, which may be adjusted according to the granularity of the historical data and forecasts.

After a period has lapsed since a given time-series model has been trained, used to generate forecasts, and/or predict anomalies, the system retrains the time-series model using more recent time-series data from the corresponding entity (Operation 402). For example, the system may regularly obtain and/or generate a new training dataset and test dataset from metrics collected over a recent number of days, weeks, months, and/or another duration. The system may use the new training dataset to generate a set of time-series models with different combinations of parameter values and evaluate accuracies of the generated time-series models using the new test dataset. The system may then select one or more of the most accurate and/or highest performing time-series models for inclusion in model repository and/or for use by monitoring module in generating forecasts and/or predicting anomalies for the entity over the subsequent period.

If the system determines that the time-series model is not stale, the resource management system obtains a time series of newly-collected metrics for each entity (Operation 410).

The system provides the newly-collected metrics to the time-series model to predict new future values (Operation 412).

4. Anomaly Detection Using Forecasted Computational Workloads

Figure 6:
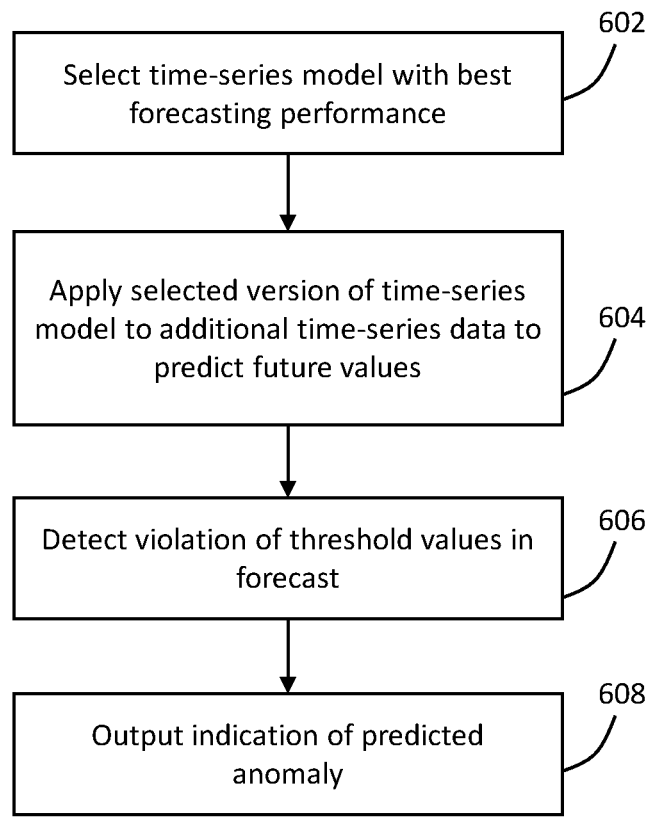
FIG. 6 illustrates an example set of operations for anomaly detection using forecasted computational workloads in accordance with one or more embodiments.

FIG. 6 illustrates a flowchart of anomaly detection using forecasted computational workloads in accordance with one or more embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, a resource management system selects a version of a time-series model with a best performance in predicting metrics from among multiple versions of the time-series model fitted to historical time-series data containing the metrics collected from a monitored system (Operation 602). For example, the version may be selected from multiple versions with different combinations of parameters used to create the time-series model.

Next, the resource management system applies the selected version to additional time-series data collected from the monitored system to generate a prediction of future values from the metrics (Operation 604). For example, the selected version generates the predictions based on previously observed values of the metrics.

The resource management system monitors the predicted metrics and detects when the predicted metrics violate a predetermined threshold (Operation 606). When the prediction violates the predetermined threshold associated with the metrics, the resource management system generates an indication of a predicted anomaly in the monitored system (Operation 608). For example, the predicted future values are compared with a threshold representing an upper limit for the metrics (e.g., 80% utilization of a resource). When some or all of the predicted future values exceed the threshold, an alert, notification, and/or another communication of the violated threshold is generated and transmitted to an administrator of the monitored system.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

FIGS. 7A-7D illustrate an example embodiment of a system 700 performing multi-layer workload forecasting of a monitored computing system 710. The monitored computing system 710 includes a node cluster including node 712 and node 713. Node 713 is a leader node in the cluster, which receives incoming requests and instructions and distributes tasks to a designated node 712 or 713. The nodes 712 and 713 both access a shared database 711 resource. Node 712 hosts a virtual machine 716 with which a client device 720 runs one or more applications. The virtual machine 716 is associated with a workload 718 defined by the tasks required to operate the virtual machine 716. The node 712 is associated with a workload 714 defined by the tasks required to perform the operations on the node 712. The node workload 714 includes the virtual machine workload 718, as well as any other tasks required to perform backend operations, run applications not accessible by the virtual machine 716, run an operating system not accessible by the virtual machine 716, and/or run virtual machines or applications in partitions of the node 712 which are not accessible by the virtual machine 716. Node 713 hosts a virtual machine 717. The virtual machine 717 is associated with a workload 719. The node 713 is associated with a workload 715. The node workload 715 includes the virtual machine workload 719, as well as any other tasks required to perform backend operations, run applications not accessible by the virtual machine 717, run an operating system not accessible by the virtual machine 717, and/or run virtual machines or applications in partitions of the node 713 which are not accessible by the virtual machine 717.

A resource management system 730 monitors operations of the computing system 710 and generates workload forecasts associated with the computing system 710. In particular, the resource management system 730 generates workload forecasts based on time-series models at a particular level of granularity. A low level of granularity may include forecasting workloads for virtual machines. A higher level of granularity may include forecasting workloads for the underlying nodes running the virtual machines. A still higher level of granularity includes forecasting workloads for sibling nodes in node clusters with a target node hosting a target virtual machine.

Figure 7A:
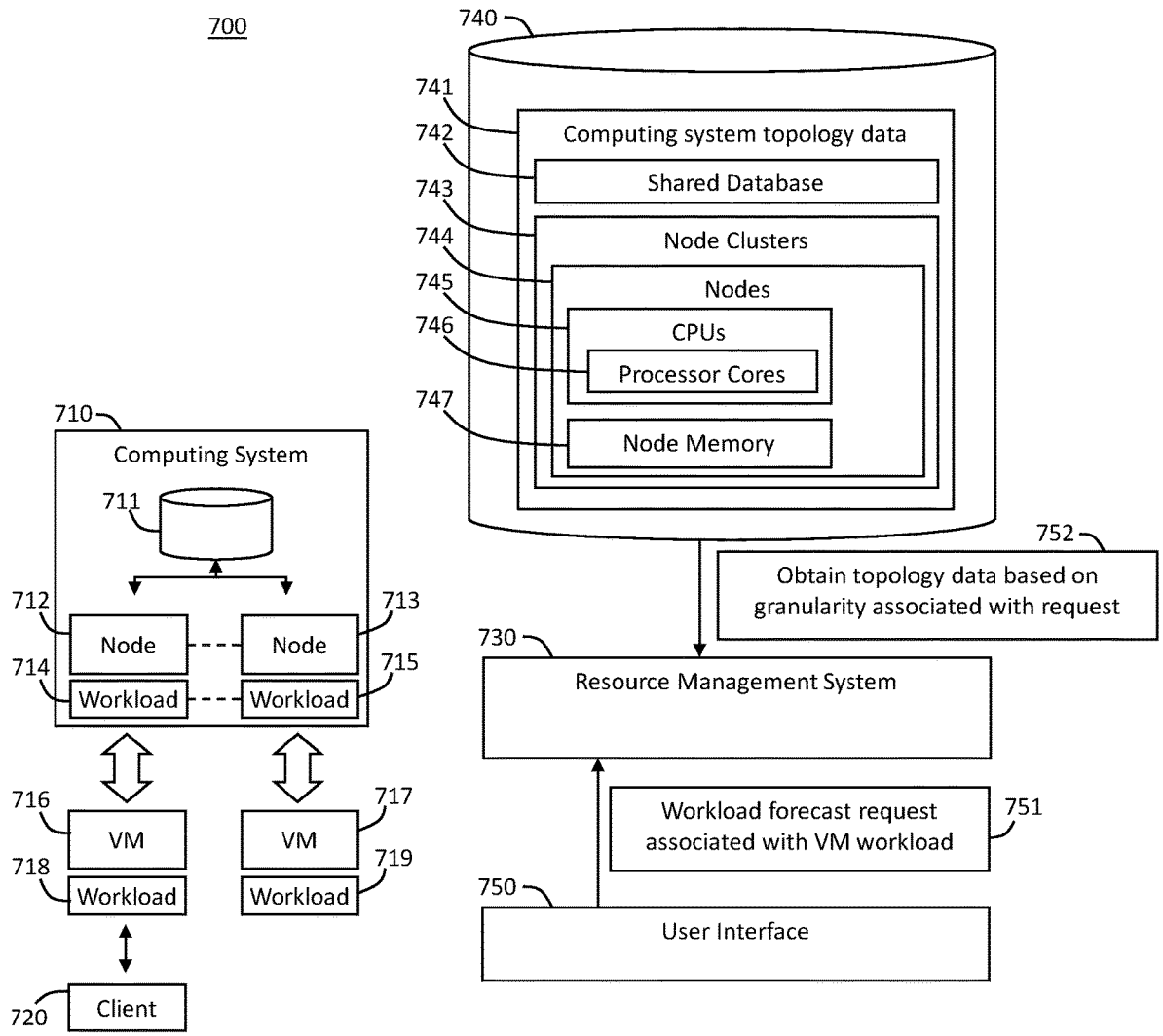
FIGS. 7A-7D illustrate an example embodiment of multi-layer forecasting in a node cluster environment.

Referring to FIG. 7A, the resource management system 730 receives a request 751 via a user interface 750 to initiate a workload forecast associated with the virtual machine workload 718. The workload forecast is to predict workload values at future times. The resource management system 730 obtains topology data based on a granularity associated with the request 752. In the example embodiment in FIG. 7A, the system 730 is configured to provide forecasts at a default granularity level unless a request 751 specifies a different granularity level. The request 751 specifies a high level of granularity, including computing workloads of processors in the nodes 712 and/or 713 associated with the virtual machine 716. The resource management system 730 obtains topology data 741 associated with the computing system 710 from a data repository 740. The topology data 741 includes entity attributes associated with the computing system 710. The entity attributes specify that the computing system 710 comprises: a shared database 742, a node cluster 743, the nodes 744 in the node cluster (i.e., nodes 712 and 713), CPU data 745 for each node, processor core data 746 for each CPU, and node memory data 747 for each node. The node data 744 includes processing capacity, memory capacity, processor types, and memory types for processors and memory devices in each node.

Figure 7B:
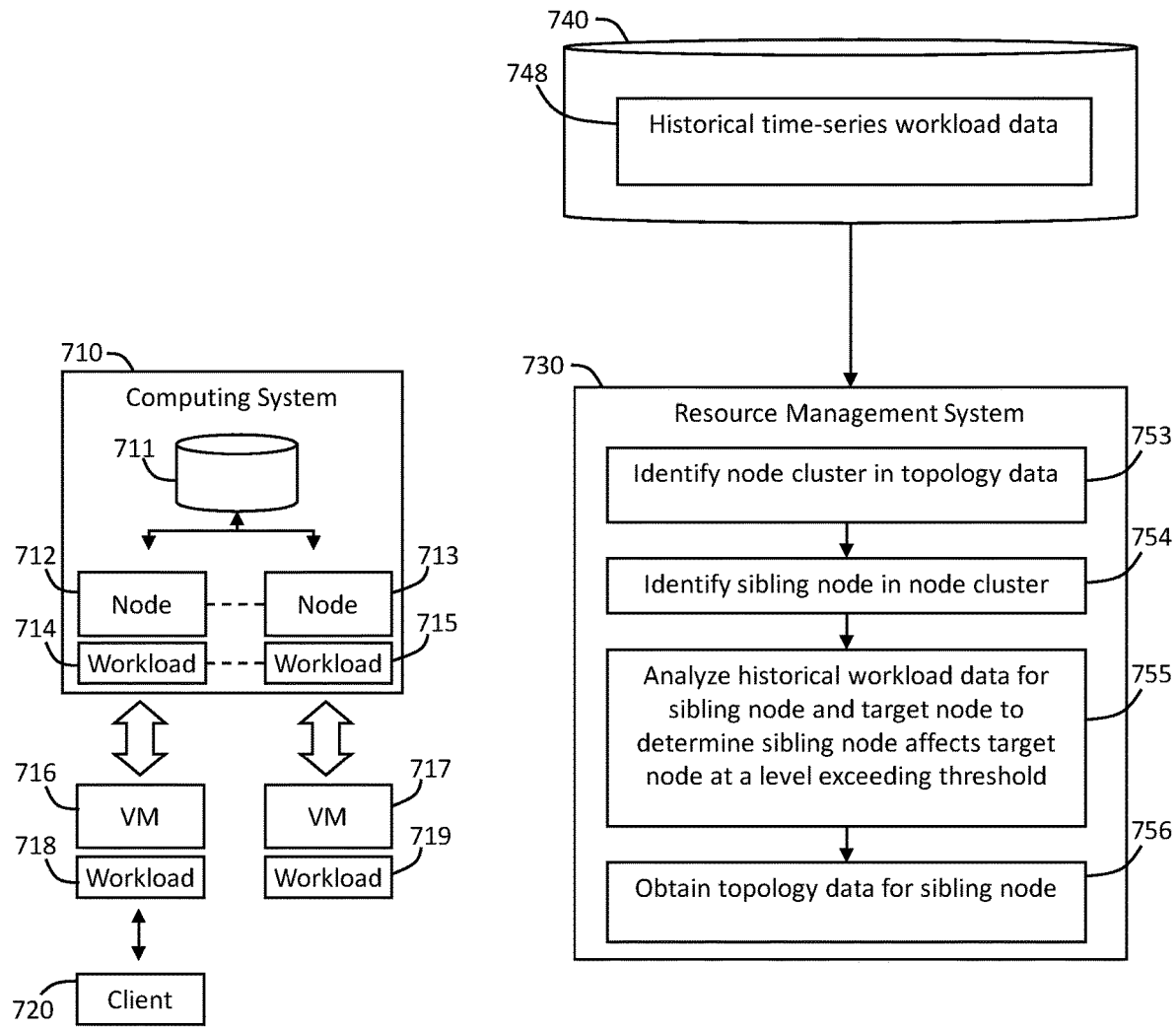

Referring to FIG. 7B, based on the topology data 741, the resource management system 730 identifies 753 the node 712 hosting the target virtual machine 716 associated with the workload forecast request 751. The resource management system 730 identifies attributes of the node 712, including processing attributes, bandwidth attributes, and memory capacity attributes. The resource management system 730 further determines 754 the node 712 is part of a node cluster including node 712 and node 713. Based on the level of granularity associated with the request 751, the resource management system 730 determines whether to respond to the request 751 with only a workload forecast for the node 712 or with workload forecasts for both nodes 712 and 713. To this end, the resource management system 730 obtains historical workload data 748 for node 712 and node 713 to determine whether operations of node 713 affect operations of node 712 at a level exceeding a threshold level. In particular, the system determines whether, in a set of time-series data associated with a week-long time period of hourly time intervals, a correlation exists between an operation of the node 713 and a reduced performance of the node 712 exceeding 10%. For example, if the time-series data indicates the node 712 is utilizing 60% of its processing capacity in one time interval, a subsequent time interval shows a spike in the processing capacity of node 713, and a subsequent time interval shows an increase in the processing capacity utilization of node 712 to 70%, the system 730 may determine that the node 713 affects the node 712 at a level exceeding the threshold level.

Based on determining a workload of the sibling node affects a workload of the target node beyond the threshold level, the resource management system 730 obtains the entity attributes associated with the sibling node. In particular, based on the initial request, the system 730 obtains entity attributes, such as processor and memory data, associated with the node 712 hosting the virtual machine 716. Based on determining the workload of the node 713 affects the workload of the node 712 at a level exceeding a threshold, the system 730 obtains the entity attributes for the sibling node 713.

Figure 7C:
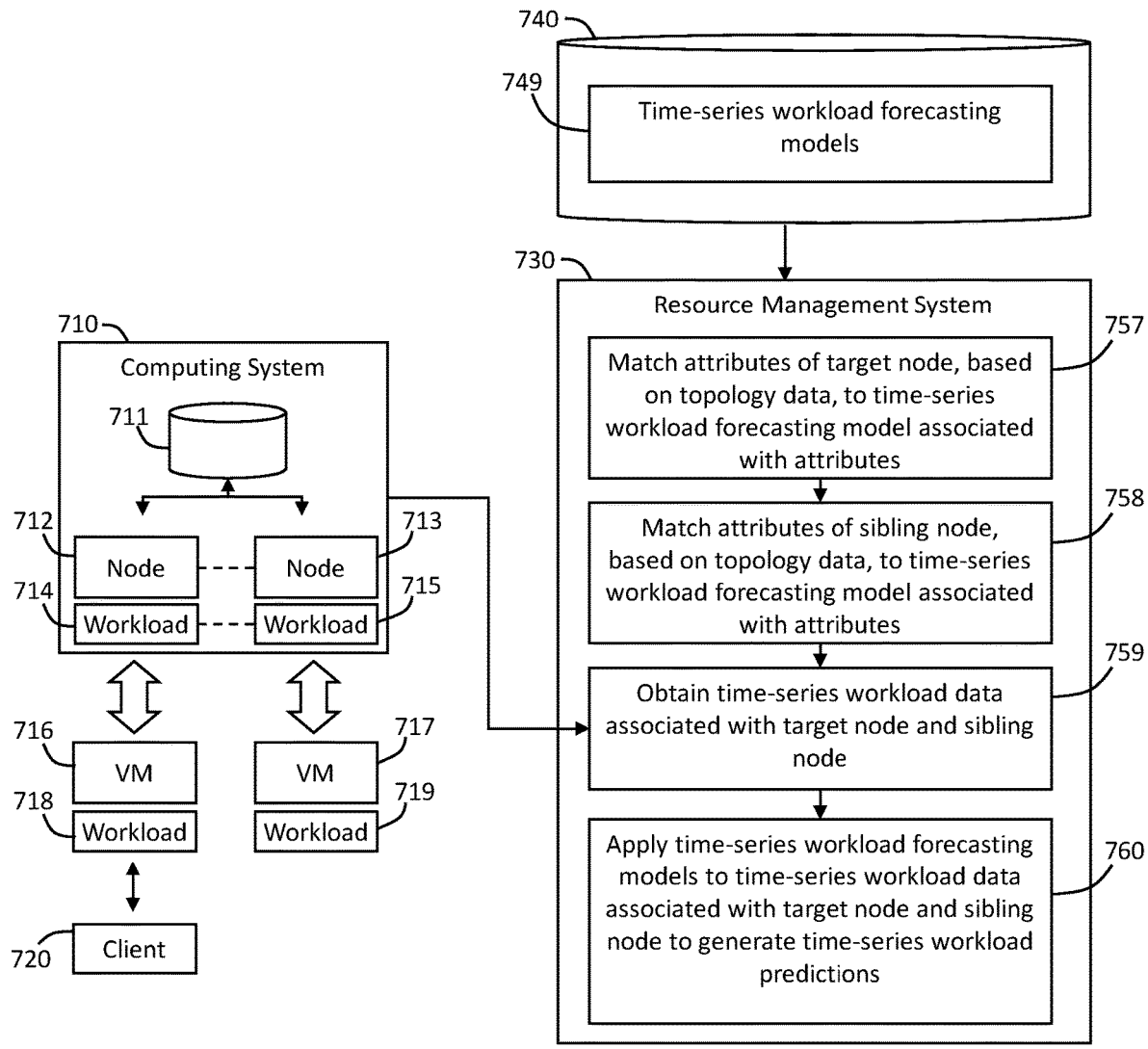

Referring to FIG. 7C, the resource management system 730 matches 757 attributes of the target node, based on the topology data, to a time-series workload forecasting model associated with the attributes. For example, a particular time-series workload forecasting model may be stored in association with a set of attributes: database type U, node cluster type V, node type W, CPU type X, processor type Y, processor cores YY, memory type Z, memory capacity ZZ. The system 730 matches the time-series workload forecasting model to the identified attributes of the target node 712. Similarly, the system 730 matches 758 a different time-series workload forecasting model to the identified attributes of the sibling node 713, which attributes are different from those of the target node 712.

The system 730 obtains current time-series workload data associated with the target node and the sibling node 759. The system 730 may monitor operations of the computing system 710 to obtain the current time-series workload data. Alternatively, the system 730 may obtain the most recently-generated time-series workload data associated with the nodes 712 and 713 from the data repository 740.

The system applies 760 the time-series workload forecasting models to the time-series workload data associated with the target node 712 and the sibling node 713 to generate time-series workload forecasts for the target node 712 and the sibling node 713.

Figure 7D:
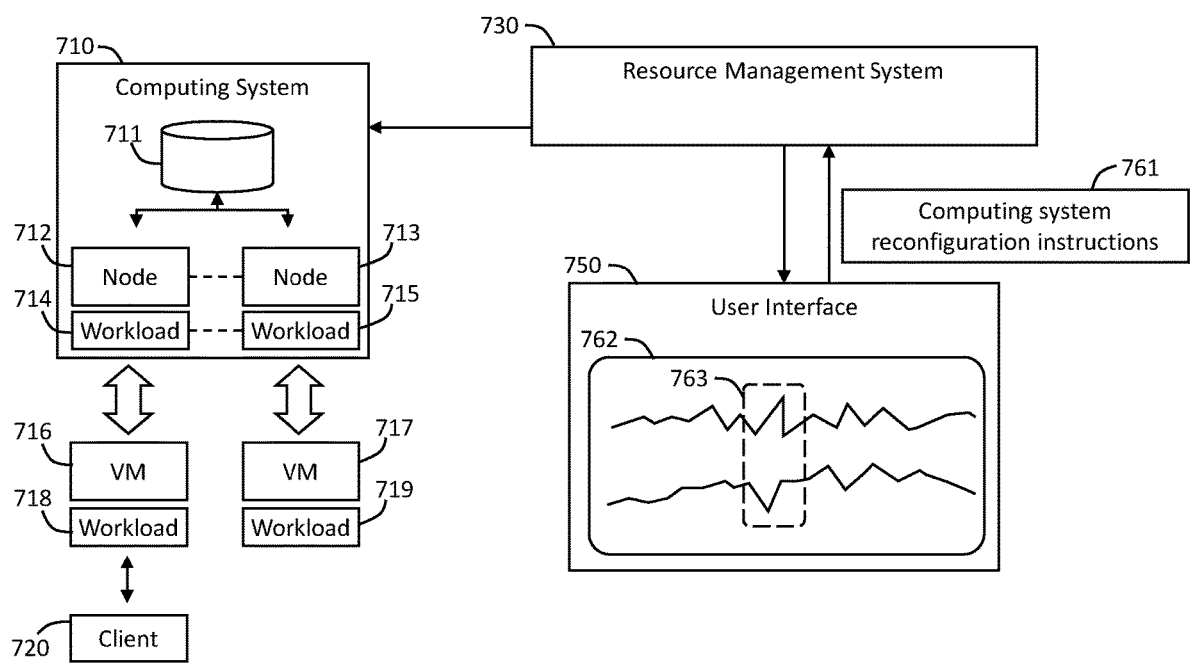

Referring to FIG. 7D, the system 730 presents the forecasts on a graph 762 on the user interface 750. The graph 762 includes a visual indicator 763 of a portion of the predicted time-series workload data in which a workload for one or both of the nodes 712 and 713 will exceed a threshold. According to one example embodiment, the graph 762 includes workload data for both the node 712 and the virtual machine 716. In particular, since the request 751 was directed to a forecast for the workload 718 associated with the virtual machine 716, the graph includes the forecast for the workload 718 associated with the virtual machine 716. However, since the workload for the virtual machine 716 is affected by the node workload 714 and the node workload 715, the resource management system 730 presents additional forecasts associated with the workloads 714 and 715 to provide a user with information required to modify or reconfigure features of the computing system 710.

Based on the data indicated in the graph 762, an operator interacts with the user interface 750 to generate instructions 761 for reconfiguring the computing system 710. For example, the instructions 761 may include instructions to add one or more additional nodes to the node cluster, to redirect particular requests from a particular client to a different node in the node cluster, or to schedule replacement of a node type of a node in the node cluster to another node type with improved node attributes.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
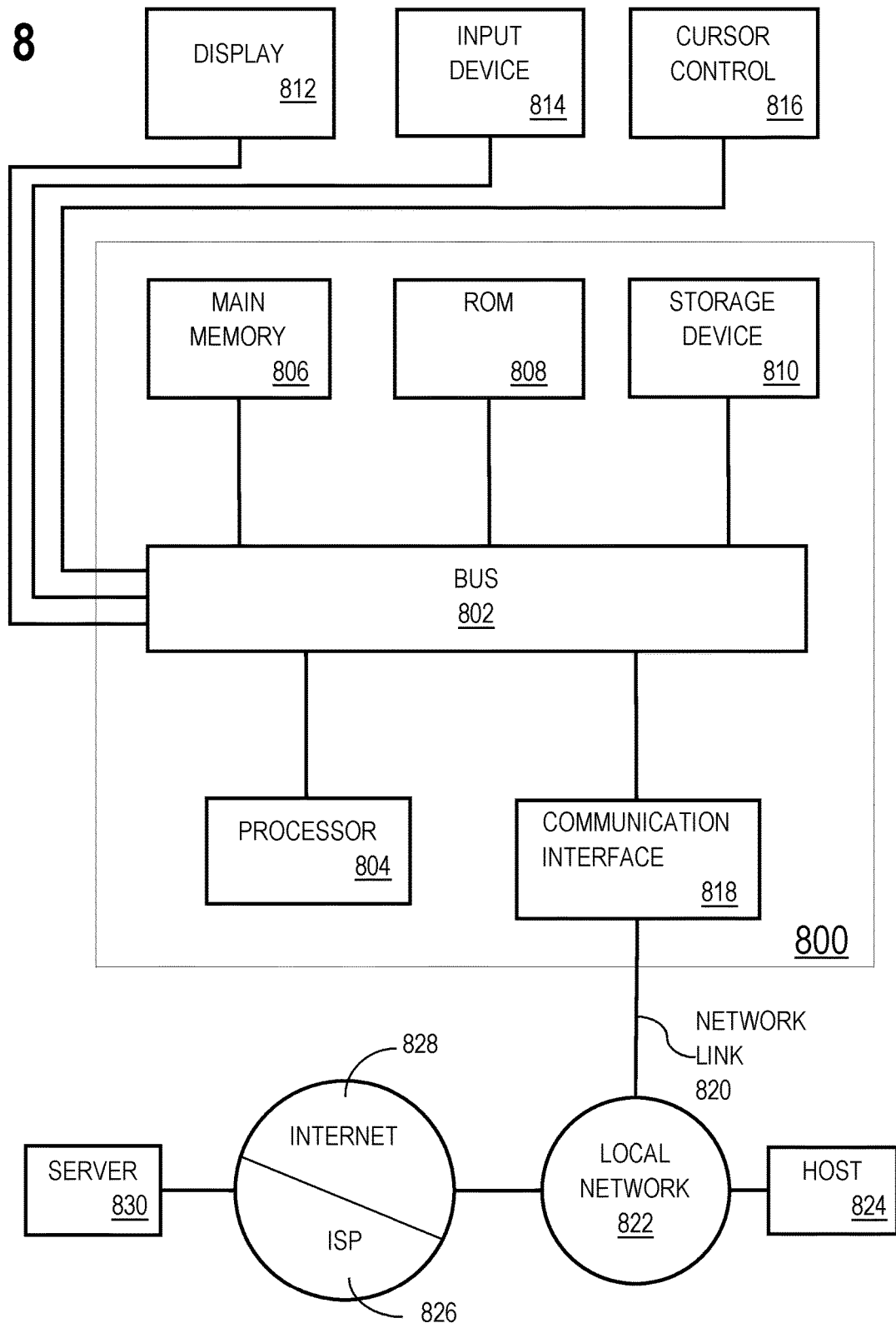
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic, or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

receiving, by a resource management system, a request to generate a first forecast for computational resource usage of an entity:

based on receiving the request, determining, by the resource management system, entity attributes for the entity that utilizes computational resources, wherein determining the entity attributes comprises:

accessing, in the request, a datum representing a particular level of granularity associated with utilization of the computational resources; and accessing, in the request, a metric representing a utilization of the computational resources;

based on the datum representing the particular level of granularity and the metric, identifying, by the resource management system, a time-series model that is trained on historical time-series data including the metric, at the particular level of granularity, for the entity;

obtaining, by the resource management system, additional time-series data including values for the metric representing the utilization of the computational resources at the particular level of granularity:

inputting the additional time-series data for the entity to the time-series model to to generate a forecast of the utilization of the computational resources by the entity; and outputting the forecast in association with the entity.

2. The non-transitory computer readable medium of claim 1, wherein the particular level of granularity comprises one of:

a set of physical hardware, including processors, facilitating data communications with the computational resources;

a virtual machine workload;

a node workload of a node hosting a virtual machine;

a database accessed by one or more nodes of a node cluster;

a database server accessing the database;

an application run by one or more nodes of the node cluster; and an application server executing one or more applications accessed by one or more nodes of the node cluster.

3. The non-transitory computer readable medium of claim 1, wherein the metric comprises at least one of:

processor usage, processor core usage, memory usage, network bandwidth usage, and I/O usage.

4. The non-transitory computer readable medium of claim 1, wherein determining the entity attributes for the entity comprises:

identifying a first computing system component specified in the request to generate a the first forecast for the computational resource usage of the entity; and based on the particular level of granularity associated with the request: identifying at least one second computing system component which is not specified in the request, wherein applying the time-series model to the additional time-series data for the entity to generate the forecast of the utilization of the computational resources by the entity includes applying the time-series model to workload data associated with the second computing system component.

5. The non-transitory computer readable medium of claim 1, wherein matching the entity attributes to the time-series model that is trained on historical time-series data for the entity comprises:

identifying at least one value associated with a first set of computational resources and metrics associated with the computational resources;

accessing a lookup table to identify the at least one value in a particular field of the lookup table; and matching the entity attributes to the time-series model by determining the time-series model is mapped to the at least one value in the lookup table.

6. The non-transitory computer readable medium of claim 1, wherein the operations further comprise:
obtaining first a request to generate a first workload forecast associated with the computational resources utilized by the entity, the first request associated with a first level of granularity;
obtaining second a request to generate a second workload forecast associated with the computational resources utilized by the entity, the second request associated with a fir-second level of granularity;
responsive to the first request, generating the first workload forecast for a first set of computational resources, among the computational resources utilized by the entity; and
responsive to the second request, generating the second workload forecast for a second set of computational resources, among the computational resources utilized by the entity, the second set of computational resources being different from the first set of computational resources.

7. A method comprising:
receiving, by a resource management system, a request to generate a first forecast for computational resource usage of an entity;
based on receiving the request, determining, by the resource management system, entity attributes for the entity that utilizes computational resources, wherein determining the entity attributes comprises:
accessing, in the request, a datum representing a particular level of granularity associated with utilization of the computational resources; and
accessing, in the request, a metric representing a utilization of the computational resources;
based on the datum representing the particular level of granularity and the metric, identifying, by the resource management system, a time-series model that is trained on historical time-series data including the metric, at the particular level of granularity, for the entity;
obtaining, by the resource management system, additional time-series data including values for the metric representing the utilization of the computational resources at the particular level of granularity:
inputting the additional time-series data for the entity to the time-series model to to generate a forecast of the utilization of the computational resources by the entity; and
outputting the forecast in association with the entity.

8. The method of claim 7, wherein determining the entity attributes for the entity comprises:
identifying a first computing system component specified in the request to generate a the first forecast for the computational resource usage of the entity; and
based on the particular level of granularity associated with the request: identifying at least one second computing system component which is not specified in the request, wherein applying the time-series model to the additional time-series data for the entity to generate the forecast of the utilization of the computational resources by the entity includes applying the time-series model to workload data associated with the second computing system component.

9. The method of claim 7, wherein matching the entity attributes to the time-series model that is trained on historical time-series data for the entity comprises:
identifying at least one value associated with a first set of computational resources and metrics associated with the computational resources;
accessing a lookup table to identify the at least one value in a particular field of the lookup table; and
matching the entity attributes to the time-series model by determining the time-series model is mapped to the at least one value in the lookup table.

10. The method of claim 7, further comprising:
obtaining first a request to generate a first workload forecast associated with the computational resources utilized by the entity, the first request associated with a first level of granularity;
obtaining second a request to generate a second workload forecast associated with the computational resources utilized by the entity, the second request associated with a fir-second level of granularity;
responsive to the first request, generating the first workload forecast for a first set of computational resources, among the computational resources utilized by the entity; and
responsive to the second request, generating the second workload forecast for a second set of computational resources, among the computational resources utilized by the entity, the second set of computational resources being different from the first set of computational resources.

11. The method of claim 7, wherein the particular level of granularity comprises one of:
a set of physical hardware, including processors, facilitating data communications with the computational resources;
a virtual machine workload;
a node workload of a node hosting a virtual machine;
a database accessed by one or more nodes of a node cluster;
a database server accessing the database;
an application run by one or more nodes of the node cluster; and
an application server executing one or more applications accessed by one or more nodes of the node cluster.

12. The method of claim 7, wherein the metric comprises at least one of:
processor usage, processor core usage, memory usage, network bandwidth usage, and I/O usage.

13. A system comprising:
one or more processors; and
memory storing instructions that, when executed by the one or more processors, cause the system to perform operations comprising:
receiving, by a resource management system, a request to generate a first forecast for computational resource usage of an entity;
based on receiving the request, determining, by the resource management system, entity attributes for the entity that utilizes computational resources, wherein determining the entity attributes comprises:
accessing, in the request, a datum representing a particular level of granularity associated with utilization of the computational resources; and
accessing, in the request, a metric representing a utilization of the computational resources;
based on the datum representing the particular level of granularity and the metric, identifying, by the resource management system, a time-series model that is trained on historical time-series data including the metric, at the particular level of granularity, for the entity;

obtaining, by the resource management system, additional time-series data including values for the metric representing the utilization of the computational resources at the particular level of granularity;

inputting the additional time-series data for the entity to the time-series model to generate a forecast of the utilization of the computational resources by the entity; and outputting the forecast in association with the entity.

14. The system of claim 13, wherein determining the entity attributes for the entity comprises:

identifying a first computing system component specified in the request to generate a the first forecast for the computational resource usage of the entity; and based on the particular level of granularity associated with the request: identifying at least one second computing system component which is not specified in the request, wherein applying the time-series model to the additional time-series data for the entity to generate the forecast of the utilization of the computational resources by the entity includes applying the time-series model to workload data associated with the second computing system component.

15. The system of claim 13, wherein matching the entity attributes to the time-series model that is trained on historical time-series data for the entity comprises:

identifying at least one value associated with a first set of computational resources and metrics associated with the computational resources;

accessing a lookup table to identify the at least one value in a particular field of the lookup table; and matching the entity attributes to the time-series model by determining the time-series model is mapped to the at least one value in the lookup table.

16. The system of claim 13, wherein the operations further comprise:

obtaining first a request to generate a first workload forecast associated with the computational resources utilized by the entity, the first request associated with a first level of granularity;

obtaining second a request to generate a second workload forecast associated with the computational resources utilized by the entity, the second request associated with a fir-second level of granularity;

responsive to the first request, generating the first workload forecast for a first set of computational resources, among the computational resources utilized by the entity; and responsive to the second request, generating the second workload forecast for a second set of computational resources, among the computational resources utilized by the entity, the second set of computational resources being different from the first set of computational resources.

17. The system of claim 13, wherein the particular level of granularity comprises one of:

a set of physical hardware, including processors, facilitating data communications with the computational resources;

a virtual machine workload;

a node workload of a node hosting a virtual machine;

a database accessed by one or more nodes of a node cluster;

a database server accessing the database;

an application run by one or more nodes of the node cluster; and an application server executing one or more applications accessed by one or more nodes of the node cluster.

18. The system of claim 13, wherein the metric comprises at least one of:

processor usage, processor core usage, memory usage, network bandwidth usage, and I/O usage.

* * * * *